United States Patent
Liu

(10) Patent No.: US 10,523,296 B2
(45) Date of Patent: Dec. 31, 2019

(54) CHANNEL STATE INFORMATION FEEDBACK METHOD, USER EQUIPMENT, AND BASE STATION

(71) Applicant: Huawei Technologies Co., Ltd., Shenzhen, Guangdong (CN)

(72) Inventor: Kunpeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/897,082

(22) Filed: Feb. 14, 2018

(65) Prior Publication Data

US 2018/0175925 A1 Jun. 21, 2018

Related U.S. Application Data

(63) Continuation of application No. PCT/CN2015/087117, filed on Aug. 15, 2015.

(51) Int. Cl.
*H04W 4/00* (2018.01)
*H04B 7/06* (2006.01)
(Continued)

(52) U.S. Cl.
CPC ............ *H04B 7/0626* (2013.01); *H04B 7/04* (2013.01); *H04B 7/0478* (2013.01); *H04B 7/065* (2013.01);
(Continued)

(58) Field of Classification Search
CPC ...... H04B 7/04; H04B 7/0413; H04B 7/0417; H04B 7/0478; H04B 7/06; H04B 7/0617;
(Continued)

(56) References Cited

U.S. PATENT DOCUMENTS 8,942,302 B2 * 1/2015 Krishnamurthy .... H04B 7/0469
370/252
9,225,478 B2 * 12/2015 Chen ..................... H04W 28/08
(Continued)

FOREIGN PATENT DOCUMENTS

CN 102684850 A 9/2012
CN 102938688 A 2/2013
(Continued)

OTHER PUBLICATIONS

Schulz, LTE Transmission Modes and Beamforming, White Paper, 25 pages, Jul. 2015.*
(Continued)

*Primary Examiner* — Frank Duong
(74) *Attorney, Agent, or Firm* — Huawei Technologies Co., Ltd.

(57) ABSTRACT

Embodiments of the present disclosure provide a channel state information feedback method, which includes: determining, by user equipment, N CSI-RS resources according to a quantity N, configured by a base station, of CSI-RS resources that need to be fed back; performing channel estimation on a port included in the N CSI-RS resources, to obtain channel state information in a horizontal dimension; then selecting M CSI-RS resources from the N CSI-RS resources; and feeding back channel state information of the M CSI-RS resources in the horizontal dimension and indication information of the M CSI-RS resources to the base station, so that the base station determines channel state information in a vertical dimension according to the indication information, so as to finally obtain channel state information in the two dimensions, thereby resolving a problem that channel state information in only a horizontal dimension is fed back during conventional channel estimation.

17 Claims, 18 Drawing Sheets

(51) Int. Cl.
*H04B 7/04* (2017.01)
*H04L 25/02* (2006.01)
*H04B 7/0456* (2017.01)

(52) U.S. Cl.
CPC ....... *H04B 7/0639* (2013.01); *H04L 25/0204* (2013.01); *H04L 25/0242* (2013.01)

(58) Field of Classification Search
CPC .... H04B 7/0626; H04B 7/0639; H04B 7/065; H04B 17/24; H04L 5/0048; H04L 25/0204; H04L 25/02; H04L 25/0242; H04L 25/03; H04L 25/03929; H04W 24/10
See application file for complete search history.

(56) References Cited

U.S. PATENT DOCUMENTS

| | | | | |
|---|---|---|---|---|
| 9,438,451 | B2 * | 9/2016 | Chen | .................... H04B 17/24 |
| 9,654,195 | B2 * | 5/2017 | Rahman | ............... H04B 7/0469 |
| 9,768,849 | B2 * | 9/2017 | Ko | ...................... H04B 7/0469 |
| 2014/0003240 | A1 | 1/2014 | Chen et al. | |
| 2014/0010126 | A1 | 1/2014 | Sayana et al. | |
| 2014/0192762 | A1 | 7/2014 | Li et al. | |
| 2015/0200754 | A1 | 7/2015 | Sayana et al. | |
| 2018/0083676 | A1 * | 3/2018 | Wei | ..................... H04B 7/0452 |

FOREIGN PATENT DOCUMENTS

| | | | |
|---|---|---|---|
| CN | 104184690 A | | 12/2014 |
| CN | 104350689 A | | 2/2015 |
| CN | 104396170 A | | 3/2015 |
| GB | 2507782 | * | 5/2014 |
| WO | 2012124552 A1 | | 9/2012 |
| WO | 2015047333 A1 | | 4/2015 |

OTHER PUBLICATIONS

ITRI, "Discussion of CSI reporting based on beamformed CSI-RS", 3GPP TSG RAN WG1 Meeting #81, Fukuoka, Japan, May 25-29, 2015, 3 pages, R1-152943, XP050968904.

* cited by examiner

4*4

Horizontal direction

2*8

| Subframe number \ Manner | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| Submode 1-1 | BI | | RI PMI 1 | | PMI 2 CQI | | | | | PMI 2 CQI | | | RI PMI | | PMI 2 CQI | | | | | PMI 2 CQI | BI |
| Submode 1-2 | BI RI PMI 1 | | | | PMI 2 CQI | | | | | PMI 2 CQI | | | | | PMI 2 CQI | | | | | PMI 2 CQI | |

FIG. 6

| Subframe number \ Manner | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| Submode 2-1 | BI | | RI | | PMI 1 PMI 2 CQI | | | | | PMI 1 PMI 2 CQI | | | RI | | PMI 1 PMI 2 CQI | | | | | PMI 1 PMI 2 CQI | |
| Submode 2-2 | BI RI | | | | PMI 1 PMI 2 CQI | | | | | PMI 1 PMI 2 CQI | | | | | PMI 1 PMI 2 CQI | | | | | PMI 1 PMI 2 CQI | |

FIG. 7

| Subframe number / Manner | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Submode 3-1 | RI | | BI PMI 1 | | PMI 2 CQI | | | | | PMI 2 CQI | | | BI PMI 1 | | PMI 2 CQI | |
| Submode 3-2 | RI | | BI PMI 1 | | BI 0-PMI 2 BI 1-PMI 2 CQI | | | | | BI 0-PMI 2 BI 1-PMI 2 CQI | | | BI PMI 1 | | BI 0-PMI 1 BI 1-PMI 2 CQI | |
| Submode 3-3 | RI | | BI PMI 1 | | BI 0-PMI 2 | | | BI 1-PMI 2 | | CQI | | | BI PMI 1 | | BI 0-PMI 2 | |
| Submode 3-4 | RI | | BI 0-PMI 1 BI 1-PMI 1 | | BI 0-PMI 2 BI 1-PMI 2 | | | BI 0-PMI 2 BI 1-PMI 2 | | CQI | | | BI 0-PMI 1 BI 1-PMI 1 | | BI 0-PMI 2 BI 1-PMI 2 | |

FIG. 9

| | BI | PMI 1 | wbPMI 2 | | | wbPMI 2 | PMI 1 |
|---|---|---|---|---|---|---|---|
| | PTI=0 | RI | wbCQI | | | wbCQI | RI |
| | RI | wbPMI 2 | sbPMI 2 | | | sbPMI 2 | wbPMI 2 |
| | PTI=1 | wbCQI | sbCQI | | | sbCQI | wbCQI |

FIG. 10

| Subframe index | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| | PTI=0 | | BI | | wb first PMI+RI | | wb second PMI+wbCQI | | | | wb second PMI+wbCQI | | | | wb first PMI+RI |
| | PTI=1 | | | | wb second PMI+wbCQI | | sb second PMI+sbCQI | | | | sb second PMI+sbCQI | | | | wb second PMI+wbCQI |

Feedback mode b

| Subframe index | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| | BI | | PTI=0 | | wb first PMI+RI | | wb second PMI+wbCQI | | | | wb second PMI+wbCQI | | | | wb first PMI+RI |
| | | | PTI=1 | | wb second PMI+wbCQI | | sb second PMI+sbCQI | | | | sb second PMI+sbCQI | | | | wb second PMI+wbCQI |

| Subframe index | 0 | 1 | 2 | 3 | 4 | 5 | 6 | 7 | 8 | 9 | 10 | 11 | 12 | |
|---|---|---|---|---|---|---|---|---|---|---|---|---|---|---|
| Feedback mode c | PTI=0 | | BI | | W1+RI | | BI 0-wb second PMI/BI 1-wb second PMI | | wbCQI | | | BI 0-wb second PMI/BI 1-wb second PMI | | W1+RI |
| | PTI=1 | | | | BI 0-wb second PMI/BI 1-wb second PMI | | BI 0-sb second PMI/BI 1-sb second PMI | | sbCQI | | | BI 0-sb second PMI/BI 1-sb second PMI | | sbCQI |

CONT. FROM FIG. 11A

| Subframe index | 0 | 1 | 2 | 3 | 4 | 5 | 6 | 7 | 8 | 9 | 10 | 11 | 12 |
|---|---|---|---|---|---|---|---|---|---|---|---|---|---|
| Feedback mode d, PTI=00 | | | BI 0-CQI | BI 0-CQI | BI 1-CQI | BI 1-CQI | BI 2-CQI | | BI 0-CQI | BI 0-CQI | BI 1-CQI | | BI 2-CQI |
| PTI=01 | | | BI | | wb first PMI+RI | | wbCQI | | wb first PMI+RI | | wbCQI | | |
| PTI=10 | | | wb second PMI+wbCQI | | BI 0-sb second PMI/ BI 1-sb second PMI | | sbCQI | | wb second PMI+wbCQI | | BI 0-sb second PMI/ BI 1-sb second PMI | | sbCQI |

CONT. FROM FIG. 11B

CONT. FROM FIG. 11C

| Subframe index | 0 | 1 | 2 | 3 | 4 | 5 | 6 | 7 | 8 | 9 | 10 | 11 | 12 |
|---|---|---|---|---|---|---|---|---|---|---|---|---|---|
| PTI=00 | PTI=00 | | RI | | wb horizontal first PMI/wb vertical first PMI | | | | RI | | wb horizontal first PMI/wb vertical first PMI | | wbCQI |
| PTI=01 | PTI=01 | | RI | | wb horizontal first PMI/sb vertical first PMI | | | | RI | | wb horizontal first PMI/sb vertical first PMI | | wbCQI |
| PTI=10 | PTI=10 | | RI | | sb horizontal first PMI/wb vertical first PMI | | | | RI | | sb horizontal first PMI/wb vertical first PMI | | wbCQI |
| PTI=11 | PTI=11 | | RI | | sb horizontal first PMI/sb vertical first PMI | | | | RI | | sb horizontal first PMI/sb vertical first PMI | | wbCQI |

Feedback mode d

| Subframe index | 0 | 1 | 2 | 3 | 4 | 5 | 6 | 7 | 8 | 9 | 10 | 11 | 12 |
|---|---|---|---|---|---|---|---|---|---|---|---|---|---|
| PTI=00 | | | RI | | wb horizontal second PMI/ wb vertical second PMI | | | | RI | | wb horizontal second PMI/ wb vertical second PMI | | wbCQI |
| PTI=01 | | | RI | | wb horizontal second PMI/ sb vertical second PMI | | | | RI | | wb horizontal second PMI/ sb vertical second PMI | | wbCQI |
| PTI=10 | | | RI | | sb horizontal second PMI/ wb vertical second PMI | | | | RI | | sb horizontal second PMI/ wb vertical second PMI | | wbCQI |
| PTI=11 | | | RI | | sb horizontal second PMI/ sb vertical second PMI | | | | RI | | sb horizontal second PMI/ sb vertical second PMI | | wbCQI |

CONT. FROM FIG. 11D

Feedback mode e

FIG. 11E

CHANNEL STATE INFORMATION FEEDBACK METHOD, USER EQUIPMENT, AND BASE STATION

CROSS-REFERENCE TO RELATED APPLICATIONS

This application is a continuation of International Application No. PCT/CN2015/087117, filed on Aug. 15, 2015, the disclosure of which is hereby incorporated by reference in its entirety.

TECHNICAL FIELD

Embodiments of the present application relate to the communications technologies, and in particular, to a channel state information feedback method, user equipment, and a base station.

BACKGROUND

In a Long Term Evolution (LTE) system, a conventional antenna array has a fixed downtilt in a vertical direction, that is, provides a fixed beam for each user equipment in a cell in a vertical direction. A three-dimensional (3D) beamforming (BF) technology is introduced to improve a cell-edge user throughput rate and a cell average throughput rate. In the 3D beamforming technology, based on an active antenna system (AAS), beams with different downtilts can be generated for each user equipment in a vertical direction according to a location of the user equipment, so that beamforming is performed in both a horizontal direction and the vertical direction. To support the 3D beamforming technology, corresponding channel state information needs to be fed back. The channel state information includes a channel quality indicator (CQI), a precoding matrix indicator (PMI), and a rank indication (RI).

The channel state information is usually obtained by user equipment by means of channel estimation. In a conventional channel estimation process, user equipment measures a reference signal (RS), which is also referred to as a pilot signal, such as a channel state information-reference signal (CSI-RS), then obtains channel state information in a horizontal dimension by means of estimation, and reports the channel state information to a base station. However, for the 3D beamforming technology, in addition to performing channel estimation on a channel in a horizontal dimension, the user equipment needs to perform channel estimation on the channel in a vertical dimension. Obviously, a conventional channel estimation method that supports channel estimation in only a horizontal dimension cannot be applicable to the 3D beamforming technology. Therefore, how to propose a channel state information feedback method becomes a problem to be urgently resolved in the industry.

SUMMARY

Embodiments of the present disclosure provide a channel state information feedback method, user equipment, and a base station, so as to resolve a problem that channel state information in only a horizontal dimension is fed back during conventional channel estimation.

According to a first aspect, an embodiment of the present disclosure provides a channel state information feedback method, including:

receiving, by user equipment UE, N configured channel state information-reference signal CSI-RS resources, where the CSI-RS resources include at least one port, N≥2, and N is an integer;

performing, by the UE, channel measurement on the N CSI-RS resources, to obtain channel state information CSI of the N CSI-RS resources;

selecting, by the UE, M CSI-RS resources from the N CSI-RS resources, where the M CSI-RS resources belong to different CSI processes, or the M CSI-RS resources belong to different configurations of one CSI process;

determining, by the UE, CSI of the M CSI-RS resources from the channel state information CSI of the N CSI-RS resources according to the M CSI-RS resources; and feeding back, by the UE, the CSI of the M CSI-RS resources and indication information of the M CSI-RS resources to a base station.

In a first possible implementation of the first aspect, the indication information of the M CSI-RS resources includes first indication information and/or second indication information, the first indication information is a value of M, and the second indication information is indexes of the M CSI-RS resources.

With reference to the first aspect or the first possible implementation of the first aspect, in a second possible implementation of the first aspect, CSI of each of the M CSI-RS resources includes: a rank indication RI, a precoding matrix indicator PMI 1 corresponding to a codeword W1, a precoding matrix indicator PMI 2 corresponding to a codeword W2, and a channel quality indicator CQI, the W1 and the W2 are respectively corresponding to W1 and W2 in a double codebook structure W, and W=W1\*W2; and the feeding back, by the UE, the CSI of the M CSI-RS resources and indication information of the M CSI-RS resources to a base station includes:

feeding back, by the UE, the CSI of the M CSI-RS resources and the indication information of the M CSI-RS resources to the base station according to a feedback mode and a feedback type, where the feedback type refers to a feedback parameter fed back by the UE at a time at a feedback moment, and the feedback parameter includes at least one of the RI, the PMI 1, the PMI 2, the CQI, or the indication information.

With reference to the second possible implementation of the first aspect, in a third possible implementation of the first aspect, the feedback mode is a first feedback mode; the feedback type includes a first feedback type, a second feedback type, and a third feedback type; the first feedback type is corresponding to a first feedback period, the second feedback type is corresponding to a second feedback period, and the third feedback type is corresponding to a third feedback period; a feedback parameter of the first feedback type includes the indication information of the M CSI-RS resources, a feedback parameter of the second feedback type includes RIs and PMIs 1 that are obtained by means of measurement according to the M CSI-RS resources, and a feedback parameter of the third feedback type includes PMIs 2 and CQIs that are obtained by means of measurement according to the M CSI-RS resources.

With reference to the third possible implementation of the first aspect, in a fourth possible implementation of the first aspect, the first feedback period>the second feedback period>the third feedback period.

With reference to the second possible implementation of the first aspect, in a fifth possible implementation of the first aspect, the feedback mode is a first feedback mode; the feedback type includes a fourth feedback type and a fifth feedback type; the fourth feedback type is corresponding to a fourth feedback period, and the fifth feedback type is corresponding to a fifth feedback period; a feedback parameter of the fourth feedback type includes the indication information of the M CSI-RS resources, and RIs and PMIs 1 that are obtained by means of measurement according to the M CSI-RS resources, and a feedback parameter of the fifth feedback type includes PMIs 2 and CQIs that are obtained by means of measurement according to the M CSI-RS resources.

With reference to the fifth possible implementation of the first aspect, in a sixth possible implementation of the first aspect, the fourth feedback period>the fifth feedback period.

With reference to the second possible implementation of the first aspect, in a seventh possible implementation of the first aspect, the feedback mode is a first feedback mode; the feedback type includes a sixth feedback type, a seventh feedback type, and an eighth feedback type; the sixth feedback type is corresponding to a sixth feedback period, the seventh feedback type is corresponding to a seventh feedback period, and the eighth feedback type is corresponding to an eighth feedback period; a feedback parameter of the sixth feedback type includes the indication information of the M CSI-RS resources, a feedback parameter of the seventh feedback type includes RIs obtained by means of measurement according to the M CSI-RS resources, and a feedback parameter of the eighth feedback type includes PMIs 1, PMIs 2, and CQIs that are obtained by means of measurement according to the M CSI-RS resources.

With reference to the seventh possible implementation of the first aspect, in an eighth possible implementation of the first aspect, the sixth feedback period>the seventh feedback period>the eighth feedback period.

With reference to the second possible implementation of the first aspect, in a ninth possible implementation of the first aspect, the feedback mode is a first feedback mode; the feedback type includes a ninth feedback type and a tenth feedback type; the ninth feedback type is corresponding to a ninth feedback period, and the tenth feedback type is corresponding to a tenth feedback period; a feedback parameter of the ninth feedback type includes the indication information and RIs of the M CSI-RS resources, and a feedback parameter of the tenth feedback type includes PMIs 1, PMIs 2, and CQIs that are obtained by means of measurement according to the M CSI-RS resources.

With reference to the ninth possible implementation of the first aspect, in a tenth possible implementation of the first aspect, the ninth feedback period>the tenth feedback period.

With reference to any one of the second to the tenth possible implementations of the first aspect, in an eleventh possible implementation of the first aspect, the RIs of the M CSI-RS resources are obtained by means of measurement according to the M CSI-RS resources.

With reference to any one of the third to the tenth possible implementations of the first aspect, in a twelfth possible implementation of the first aspect, M is 1 in the first feedback mode.

With reference to the second possible implementation of the first aspect, in a thirteenth possible implementation of the first aspect, M≥2, it is assumed that PMIs 1 obtained by means of measurement according to the M CSI-RS resources are the same, and PMIs 2 obtained by means of measurement according to the CSI-RS resources are the same or different, a precoding matrix corresponding to the PMI 1 and the PMI 2 is obtained by means of measurement according to each CSI-RS resource, and an antenna quantity corresponding to the precoding matrix is a quantity of antenna ports included in each CSI-RS resource; and the feedback mode is a second feedback mode; the feedback type includes an eleventh feedback type, a twelfth feedback type, and a thirteenth feedback type; the eleventh feedback type is corresponding to an eleventh feedback period, the twelfth feedback type is corresponding to a twelfth feedback period, and the thirteenth feedback type is corresponding to a thirteenth feedback period; a feedback parameter of the eleventh feedback type includes RIs obtained by means of measurement according to the M CSI-RS resources, a feedback parameter of the twelfth feedback type includes the indication information and the PMIs 1 of the M CSI-RS resources, and a feedback parameter of the thirteenth feedback type includes the PMIs 2 and CQIs that are obtained by means of measurement according to the M CSI-RS resources, where a quantity of the PMIs 1 is 1, and if the PMIs 2 obtained by means of measurement according to the CSI-RS resources are the same, a quantity of the PMIs 2 is 1, or if the PMIs 2 obtained by means of measurement according to the CSI-RS resources are different, the PMIs 2 are M PMIs 2.

With reference to the thirteenth possible implementation of the first aspect, in a fourteenth possible implementation of the first aspect, the eleventh feedback period>the twelfth feedback period>the thirteenth feedback period.

With reference to the second possible implementation of the first aspect, in a fifteenth possible implementation of the first aspect, M≥2, and it is assumed that PMIs 1 obtained by means of measurement according to the M CSI-RS resources are the same or different, and PMIs 2 obtained by means of measurement according to the CSI-RS resources are different; and the feedback mode is a second feedback mode; the feedback type includes a fourteenth feedback type, a fifteenth feedback type, a sixteenth feedback type, a seventeenth feedback type, and an eighteenth feedback type; the fourteenth feedback type is corresponding to a fourteenth feedback period, the fifteenth feedback type is corresponding to a fifteenth feedback period, the sixteenth feedback type is corresponding to a sixteenth feedback period, the seventeenth feedback type is corresponding to a seventeenth feedback period, and the eighteenth feedback type is corresponding to an eighteenth feedback period; a feedback parameter of the fourteenth feedback type includes RIs obtained by means of measurement according to the M CSI-RS resources, a feedback parameter of the fifteenth feedback type includes the indication information of the M CSI-RS resources and the PMIs 1 obtained by means of measurement according to the M CSI-RS resources, a feedback parameter of the sixteenth feedback type includes PMIs 2 obtained by means of measurement according to some of the M CSI-RS resources, a feedback parameter of the seventeenth feedback type includes PMIs 2 obtained by means of measurement according to remaining resources of the M CSI-RS resources, and a feedback parameter of the eighteenth feedback type includes CQIs obtained by means of measurement according to the M CSI-RS resources by using the PMIs 1 and the PMIs 2; where if the PMIs 1 obtained by means of measurement according to the CSI-RS resources are the same, a quantity of the PMIs 1 is 1, or if the PMIs 1 obtained by means of measurement according to the CSI-RS resources are different, the PMIs 1 are M PMIs 1.

With reference to the fifteenth possible implementation of the first aspect, in a sixteenth possible implementation of the first aspect, the fourteenth feedback period>the fifteenth feedback period>the sixteenth feedback period>the seventeenth feedback period>the eighteenth feedback period.

With reference to any one of the first aspect or the first to the sixteenth possible implementations of the first aspect, in a seventeenth possible implementation of the first aspect, M is notified by the base station to the UE, or is determined by the UE.

With reference to any one of the second to the sixteenth possible implementations of the first aspect, in an eighteenth possible implementation of the first aspect, the method further includes:

determining, by the UE, the feedback mode according to M.

With reference to the third possible implementation of the first aspect, in a nineteenth possible implementation of the first aspect, the feeding back, by the UE, indication information of the M CSI-RS resources to a base station includes:

feeding back, by the UE, the first indication information and the second indication information in different feedback types.

With reference to the first aspect, in a twentieth possible implementation of the first aspect, the feeding back, by the UE, indication information of the M CSI-RS resources to a base station includes:

aperiodically feeding back, by the UE, the indication information of the M CSI-RS resources to the base station according to triggering by the base station.

With reference to the third possible implementation of the first aspect, in a twenty-first possible implementation of the first aspect, the CSI further includes a precoding type index PTI, a precoding matrix indicator PMI 2 corresponding to a subband codeword W2, and a subband channel quality indicator CQI; and when the PTI=0, the feedback parameter included in the feedback type is a precoding matrix indicator PMI 2 corresponding to a wideband codeword W2, and a wideband channel quality indicator CQI; or when the PTI=1, the feedback parameter included in the feedback type is the precoding matrix indicator PMI 2 corresponding to the subband codeword W2, and the subband channel quality indicator CQI;

when PMI=0, the indication information is updated; or when PMI=1, the indication information is not updated; and a sequence of feeding back the PTI and the indication information may be one of the following sequences:

the PTI and the indication information are fed back at the same time; the PTI is fed back first, and then the indication information is fed back; or the indication information is fed back first, and then the PTI is fed back.

According to a second aspect, an embodiment of the present disclosure provides a channel state information feedback method, including:

receiving, by the base station, CSI of M CSI-RS resources and indication information of the M CSI-RS resources that are fed back by user equipment UE, where the M CSI-RS resources are selected by the UE from N CSI-RS resources, the N CSI-RS resources are configured by the base station and received by the UE, the CSI-RS resources include at least one port, N≥2, and N is an integer; and performing, by the base station, precoding according to the M CSI-RS resources.

In a first possible implementation of the second aspect, the indication information of the M CSI-RS resources includes first indication information and/or second indication information, the first indication information is a value of M, and the second indication information is indexes of the M CSI-RS resources.

With reference to the second aspect or the first possible implementation of the second aspect, in a second possible implementation of the second aspect, CSI of each of the M CSI-RS resources includes: a rank indication RI, a precoding matrix indicator PMI 1 corresponding to a codeword W1, a precoding matrix indicator PMI 2 corresponding to a codeword W2, and a channel quality indicator CQI, the W1 and the W2 are respectively corresponding to W1 and W2 in a double codebook structure W, and W=W1*W2; and the receiving, by the base station, CSI of M CSI-RS resources and indication information of the M CSI-RS resources that are fed back by user equipment UE includes:

receiving, by the base station, the CSI of the M CSI-RS resources and the indication information of the M CSI-RS resources that are fed back by the UE according to a feedback mode and a feedback type, where the feedback type refers to a feedback parameter fed back by the UE at a time at a feedback moment, and the feedback parameter includes at least one of the RI, the PMI 1, the PMI 2, the CQI, or the indication information.

With reference to the second possible implementation of the second aspect, in a third possible implementation of the second aspect, the feedback mode is a first feedback mode; the feedback type includes a first feedback type, a second feedback type, and a third feedback type; the first feedback type is corresponding to a first feedback period, the second feedback type is corresponding to a second feedback period, and the third feedback type is corresponding to a third feedback period; a feedback parameter of the first feedback type includes the indication information of the M CSI-RS resources, a feedback parameter of the second feedback type includes RIs and PMIs 1 that are obtained by means of measurement according to the M CSI-RS resources, and a feedback parameter of the third feedback type includes PMIs 2 and CQIs that are obtained by means of measurement according to the M CSI-RS resources.

With reference to the third possible implementation of the second aspect, in a fourth possible implementation of the fourth aspect, the first feedback period>the second feedback period>the third feedback period.

With reference to the second possible implementation of the second aspect, in a fifth possible implementation of the second aspect, the feedback mode is a first feedback mode; the feedback type includes a fourth feedback type and a fifth feedback type; the fourth feedback type is corresponding to a fourth feedback period, and the fifth feedback type is corresponding to a fifth feedback period; a feedback parameter of the fourth feedback type includes the indication information of the M CSI-RS resources, and RIs and PMIs 1 that are obtained by means of measurement according to the M CSI-RS resources, and a feedback parameter of the fifth feedback type includes PMIs 2 and CQIs that are obtained by means of measurement according to the M CSI-RS resources.

With reference to the fifth possible implementation of the second aspect, in a sixth possible implementation of the second aspect, the fourth feedback period>the fifth feedback period.

With reference to the second possible implementation of the second aspect, in a seventh possible implementation of the second aspect, the feedback mode is a first feedback mode; the feedback type includes a sixth feedback type, a seventh feedback type, and an eighth feedback type; the sixth feedback type is corresponding to a sixth feedback period, the seventh feedback type is corresponding to a seventh feedback period, and the eighth feedback type is corresponding to an eighth feedback period; a feedback parameter of the sixth feedback type includes the indication information of the M CSI-RS resources, a feedback parameter of the seventh feedback type includes RIs obtained by means of measurement according to the M CSI-RS resources, and a feedback parameter of the eighth feedback type includes PMIs 1, PMIs 2, and CQIs that are obtained by means of measurement according to the M CSI-RS resources.

With reference to the seventh possible implementation of the second aspect, in an eighth possible implementation of the second aspect, the sixth feedback period>the seventh feedback period>the eighth feedback period.

With reference to the second possible implementation of the second aspect, in a ninth possible implementation of the second aspect, the feedback mode is a first feedback mode; the feedback type includes a ninth feedback type and a tenth feedback type; the ninth feedback type is corresponding to a ninth feedback period, and the tenth feedback type is corresponding to a tenth feedback period; a feedback parameter of the ninth feedback type includes the indication information and RIs of the M CSI-RS resources, and a feedback parameter of the tenth feedback type includes PMIs 1, PMIs 2, and CQIs that are obtained by means of measurement according to the M CSI-RS resources.

With reference to the ninth possible implementation of the second aspect, in a tenth possible implementation of the second aspect, the ninth feedback period>the tenth feedback period.

With reference to any one of the second to the tenth possible implementations of the second aspect, in an eleventh possible implementation of the second aspect, the RIs of the M CSI-RS resources are obtained by means of measurement according to the M CSI-RS resources.

With reference to any one of the third to the tenth possible implementations of the second aspect, in a twelfth possible implementation of the second aspect, M is 1 in the first feedback mode.

With reference to the second possible implementation of the second aspect, in a thirteenth possible implementation of the second aspect, M≥2, it is assumed that PMIs 1 obtained by means of measurement according to the M CSI-RS resources are the same, and PMIs 2 obtained by means of measurement according to the CSI-RS resources are the same or different, a precoding matrix corresponding to the PMI 1 and the PMI 2 is obtained by means of measurement according to each CSI-RS resource, and an antenna quantity corresponding to the precoding matrix is a quantity of antenna ports included in each CSI-RS resource; and the feedback mode is a second feedback mode; the feedback type includes an eleventh feedback type, a twelfth feedback type, and a thirteenth feedback type; the eleventh feedback type is corresponding to an eleventh feedback period, the twelfth feedback type is corresponding to a twelfth feedback period, and the thirteenth feedback type is corresponding to a thirteenth feedback period; a feedback parameter of the eleventh feedback type includes RIs obtained by means of measurement according to the M CSI-RS resources, a feedback parameter of the twelfth feedback type includes the indication information and the PMIs 1 of the M CSI-RS resources, and a feedback parameter of the thirteenth feedback type includes the PMIs 2 and CQIs that are obtained by means of measurement according to the M CSI-RS resources, where a quantity of the PMIs 1 is 1, and if the PMIs 2 obtained by means of measurement according to the CSI-RS resources are the same, a quantity of the PMIs 2 is 1, or if the PMIs 2 obtained by means of measurement according to the CSI-RS resources are different, the PMIs 2 are M PMIs 2.

With reference to the thirteenth possible implementation of the second aspect, in a fourteenth possible implementation of the second aspect, the eleventh period>the twelfth period>the thirteenth period.

With reference to the second possible implementation of the second aspect, in a fifteenth possible implementation of the second aspect, M≥2, and it is assumed that PMIs 1 obtained by means of measurement according to the M CSI-RS resources are the same or different, and PMIs 2 obtained by means of measurement according to the CSI-RS resources are different; and the feedback mode is a second feedback mode; the feedback type includes a fourteenth feedback type, a fifteenth feedback type, a sixteenth feedback type, a seventeenth feedback type, and an eighteenth feedback type; the fourteenth feedback type is corresponding to a fourteenth feedback period, the fifteenth feedback type is corresponding to a fifteenth feedback period, the sixteenth feedback type is corresponding to a sixteenth feedback period, the seventeenth feedback type is corresponding to a seventeenth feedback period, and the eighteenth feedback type is corresponding to an eighteenth feedback period; a feedback parameter of the fourteenth feedback type includes RIs obtained by means of measurement according to the M CSI-RS resources, a feedback parameter of the fifteenth feedback type includes the indication information of the M CSI-RS resources and the PMIs 1 obtained by means of measurement according to the M CSI-RS resources, a feedback parameter of the sixteenth feedback type includes PMIs 2 obtained by means of measurement according to some of the M CSI-RS resources, a feedback parameter of the seventeenth feedback type includes PMIs 2 obtained by means of measurement according to remaining resources of the M CSI-RS resources, and a feedback parameter of the eighteenth feedback type includes CQIs obtained by means of measurement according to the M CSI-RS resources by using the PMIs 1 and the PMIs 2; where if the PMIs 1 obtained by means of measurement according to the CSI-RS resources are the same, a quantity of the PMIs 1 is 1, or if the PMIs 1 obtained by means of measurement according to the CSI-RS resources are different, the PMIs 1 are M PMIs 1.

With reference to the fifteenth possible implementation of the second aspect, in a sixteenth possible implementation of the second aspect, the fourteenth feedback period>the fifteenth feedback period>the sixteenth feedback period>the seventeenth feedback period>the eighteenth feedback period.

With reference to any one of the second aspect or the first to the sixteenth possible implementations of the second aspect, in a seventeenth possible implementation of the second aspect, M is notified by the UE to the base station, or is determined by the base station.

With reference to the second possible implementation of the second aspect, in an eighteenth possible implementation of the second aspect, the receiving, by the base station, indication information of the M CSI-RS resources fed back by UE includes:

receiving, by the base station, the first indication information and the second indication information that are fed back by the UE in different feedback types.

With reference to the second aspect, in a nineteenth possible implementation of the second aspect, the receiving, by the base station, indication information of the M CSI-RS resources fed back by UE includes:

receiving, by the base station, the indication information of the M CSI-RS resources that is a periodically fed back by the UE according to triggering by the base station.

With reference to the second possible implementation of the second aspect, in a twentieth possible implementation of the second aspect, the CSI further includes a precoding type index PTI, a precoding matrix indicator PMI 2 corresponding to a subband codeword W2, and a subband channel quality indicator CQI; and when the PTI=0, the feedback parameter included in the feedback type is a precoding matrix indicator PMI 2 corresponding to a wideband codeword W2, and a wideband channel quality indicator CQI; or when the PTI=1, the feedback parameter included in the feedback type is the precoding matrix indicator PMI 2 corresponding to the subband codeword W2, and the subband channel quality indicator CQI;

when PMI=0, the indication information is updated; or when PMI=1, the indication information is not updated;

a sequence of feeding back the PTI and the indication information may be one of the following sequences:

the PTI and the indication information are fed back at the same time; the PTI is fed back first, and then the indication information is fed back; or the indication information is fed back first, and then the PTI is fed back; and the base station receives the indication information of the M CSI-RS resources that is a periodically fed back by the UE.

According to a third aspect, an embodiment of the present disclosure provides a channel state information feedback method, including:

performing, by user equipment UE, channel measurement according to reference signal resources including X antenna ports, to obtain channel state information CSI; and feeding back, by the user equipment, the channel state information CSI to a base station, where an antenna array corresponding to the X antenna ports includes at least two rows and two columns, and the CSI includes at least CSI of $M_a$ horizontal ports in the antenna array and CSI of $N_a$ vertical ports in the antenna array.

In a first possible implementation of the third aspect, a precoding matrix for the X antenna ports is W=W1×W2;

the first codeword W1 is $$W_1(k, l) = \begin{bmatrix} \tilde{X}_H^k \otimes \tilde{X}_V^l & 0 \\ 0 & \tilde{X}_H^k \otimes \tilde{X}_V^l \end{bmatrix},$$

where k=0, . . . , $M_a Q_H$−1, l=0, . . . , $N_a Q_V$−1, $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^b-1}]$, l=0, . . . L, l'=f(l), where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^b-1}]$, k=0, . . . K, k'=f(k), where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $$X^l = \begin{bmatrix} 1 & e^{j2\pi \frac{l}{NQ}} & \ldots & e^{j2\pi \frac{(N-1)l}{NQ}} \end{bmatrix}^T, l = 0, \ldots, NQ - 1.$$

With reference to the first possible implementation of the third aspect, in a second possible implementation of the third aspect, before the feeding back, by the UE, the channel state information to a base station, the method further includes:

determining, by the UE, a rank of the antenna array corresponding to $M_a \times N_a \times 2$ ports;

determining, by the UE, a group number k of a fixed beam group $\tilde{X}_H^k$ in the horizontal dimension of the antenna array;

determining, by the UE, a group number l of a fixed beam group $\tilde{X}_V^l$ in the vertical dimension of the antenna array; and generating, by the UE, a precoding matrix according to k, l, and the second codeword W2, and determining a channel quality indicator CQI according to the precoding matrix; where the channel state information includes the rank, k, l, the CQI, and a precoding matrix indicator PMI 2 corresponding to the second codeword W2; and the feeding back, by the user equipment, the CSI to a base station includes:

feeding back, by the UE according to a feedback type, the rank, k, l, and the CQI to the base station, where the feedback type refers to a feedback parameter fed back by the UE at a time at a feedback moment, and the feedback parameter includes at least one of the rank, k, l, the PMI 2, or the CQI.

With reference to the second possible implementation of the third aspect, in a third possible implementation of the third aspect, the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes k, a feedback parameter of the third feedback type includes l, a feedback parameter of the fourth feedback type includes the PMI 2 corresponding to the second codeword W2, and a feedback parameter of the fifth feedback type includes the CQI.

With reference to the third possible implementation of the third aspect, in a second possible implementation of the fourth aspect, the first feedback period>the second feedback period>the fourth feedback period>the fifth feedback period, or the first feedback period>the third feedback period>the fourth feedback period>the fifth feedback period.

In a fifth possible implementation of the third aspect, W=W1×W3;

the first codeword W1 is $$W_1(k, l) = \begin{bmatrix} \tilde{X}_H^k * W_2^H \otimes \tilde{X}_V^l * W_2^V & 0 \\ 0 & \tilde{X}_H^k * W_2^H \otimes \tilde{X}_V^l * W_2^V \end{bmatrix},$$

where $M_a$ is a a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^b-1}]$, $l=0, \ldots L$, $l'=f(l)$, where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^b-1}]$, $k=0, \ldots K$, $k'=f(k)$, where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension;

$W_2^H$ is a second precoding matrix in the horizontal dimension, and is used to perform column selection for $\tilde{X}_H^k$, $W_2^V$ is a second precoding matrix in the vertical dimension, and is used to perform column selection for $\tilde{X}_V^l$, and W3 is used to adjust phases of the two groups of antennas of W1; and the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes the first precoding matrix corresponding to the horizontal dimension of the antenna array, a feedback parameter of the third feedback type includes the first precoding matrix corresponding to the vertical dimension, a feedback parameter of the fourth feedback type includes the second precoding matrix corresponding to the horizontal dimension, a feedback parameter of the fifth feedback type includes the second precoding matrix corresponding to the vertical dimension, and a feedback parameter of a sixth feedback type includes a CQI; the first feedback period>the second feedback period>the third feedback period>the sixth feedback period, or the first feedback period>the third feedback period>the fourth feedback period>the sixth feedback period.

According to a fourth aspect, an embodiment of the present disclosure provides a channel state information feedback method, including:

receiving, by a base station, channel state information CSI fed back by user equipment UE, where the CSI is obtained by the user equipment by means of channel measurement according to reference signal resources including X antenna ports, an antenna array corresponding to the X antenna ports includes at least two rows and two columns, and the CSI includes at least CSI of $M_a$ horizontal ports in the antenna array and CSI of $N^a$ vertical ports in the antenna array; and performing, by the base station, precoding according to the channel state information.

In a first possible implementation of the fourth aspect, a precoding matrix for the X antenna ports is W=W1×W2;

the first codeword W1 is $$W_1(k, l) = \begin{bmatrix} \tilde{X}_H^k \otimes \tilde{X}_V^l & 0 \\ 0 & \tilde{X}_H^k \otimes \tilde{X}_V^l \end{bmatrix},$$

where $k=0, \ldots, M_a Q_H-1$, $l=0, \ldots, N_a Q^V-1$, $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^b-1}]$, $l=0, \ldots L$, $l'=f(l)$, where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^b-1}]$, $k=0, \ldots K$, $k'=f(k)$, where $\tilde{X}_H^k$ where H is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $$X^l = \begin{bmatrix} 1 & e^{j2\pi \frac{l}{NQ}} & \cdots & e^{j2\pi \frac{(N-1)l}{NQ}} \end{bmatrix}^T, l = 0, \ldots, NQ-1.$$

With reference to the first possible implementation of the fourth aspect, in a second possible implementation of the fourth aspect, the channel state information includes a rank of the antenna array corresponding to $M_a \times N_a \times 2$ ports that is determined by the UE, a group number k of a fixed beam group H in the horizontal dimension of the antenna array that is determined by the UE, a group number l of a fixed beam group $\tilde{X}_V^l$ in the vertical dimension of the antenna array that is determined by the UE, and a channel quality indicator CQI determined by the UE; and the receiving, by a base station, channel state information CSI fed back by user equipment UE includes:

receiving, by the base station, the rank, k, l, the CQI, and a precoding matrix indicator PMI 2 corresponding to the second codeword W2 that are fed back by the UE according to a feedback type, where the feedback type refers to a feedback parameter fed back by the UE at a time at a feedback moment, and the feedback parameter includes at least one of the rank, k, l, the PMI 2, or the CQI.

With reference to the second possible implementation of the fourth aspect, in a third possible implementation of the fourth aspect, the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes k, a feedback parameter of the third feedback type includes l, a feedback parameter of the fourth feedback type includes the PMI 2 corresponding to the second codeword W2, and a feedback parameter of the fifth feedback type includes the CQI.

With reference to the third possible implementation of the fourth aspect, in a fourth possible implementation of the fourth aspect, the first feedback period>the second feedback period>the fourth feedback period>the fifth feedback period, or the first feedback period>the third feedback period>the fourth feedback period>the fifth feedback period.

In a fifth possible implementation of the fourth aspect, W=W1×W3;
the first codeword W1 is $$W_1(k, l) = \begin{bmatrix} \tilde{X}_H^k * W_2^H \otimes \tilde{X}_V^l * W_2^V & 0 \\ 0 & \tilde{X}_H^k * W_2^H \otimes \tilde{X}_V^l * W_2^V \end{bmatrix},$$

where $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;
$\tilde{X}_V^l = [X_V^{l'} X_V^{l'+1} \ldots X_V^{l'+N_V^b-1}]$, l=0, ... L, l'=f(l), where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;
$\tilde{X}_H^k = [X_H^{k'} X_H^{k'+1} \ldots X_H^{k'+N_H^b-1}]$, k=0, ... K, k'=f(k), where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension;
$W_2^H$ is a second precoding matrix in the horizontal dimension, and is used to perform column selection for $\tilde{X}_H^k$, $W_2^V$ is a second precoding matrix in the vertical dimension, and is used to perform column selection for $\tilde{X}_V^l$, and W3 is used to adjust phases of the two groups of antennas of W1; and the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes the first precoding matrix corresponding to the horizontal dimension of the antenna array, a feedback parameter of the third feedback type includes the first precoding matrix corresponding to the vertical dimension, a feedback parameter of the fourth feedback type includes the second precoding matrix corresponding to the horizontal dimension, a feedback parameter of the fifth feedback type includes the second precoding matrix corresponding to the vertical dimension, and a feedback parameter of a sixth feedback type includes a CQI; the first feedback period>the second feedback period>the third feedback period>the sixth feedback period, or the first feedback period>the third feedback period>the fourth feedback period>the sixth feedback period.

According to a fifth aspect, an embodiment of the present disclosure provides user equipment, including:

a receiving module, configured to receive N configured channel state information-reference signal CSI-RS resources, where the CSI-RS resources include at least one port, N≥2, and N is an integer;

a channel measurement module, configured to perform channel measurement on the N CSI-RS resources, to obtain channel state information CSI of the N CSI-RS resources;

a selection module, configured to select M CSI-RS resources from the N CSI-RS resources, where the M CSI-RS resources belong to different CSI processes, or the M CSI-RS resources belong to different configurations of one CSI process;

a determining module, configured to determine CSI of the M CSI-RS resources from the channel state information CSI of the N CSI-RS resources according to the M CSI-RS resources; and a feedback module, configured to feed back the CSI of the M CSI-RS resources and indication information of the M CSI-RS resources to a base station.

In a first possible implementation of the fifth aspect, the indication information of the M CSI-RS resources includes first indication information and/or second indication information, the first indication information is a value of M, and the second indication information is indexes of the M CSI-RS resources.

With reference to the fifth aspect or the first possible implementation of the fifth aspect, in a second possible implementation of the fifth aspect, CSI of each of the M CSI-RS resources includes: a rank indication RI, a precoding matrix indicator PMI 1 corresponding to a codeword W1, a precoding matrix indicator PMI 2 corresponding to a codeword W2, and a channel quality indicator CQI, the W1 and the W2 are respectively corresponding to W1 and W2 in a double codebook structure W, and W=W1*W2; and the feedback module is specifically configured to feed back the CSI of the M CSI-RS resources and the indication information of the M CSI-RS resources to the base station according to a feedback mode and a feedback type, where the feedback type refers to a feedback parameter fed back by the UE at a time at a feedback moment, and the feedback parameter includes at least one of the RI, the PMI 1, the PMI 2, the CQI, or the indication information.

With reference to the second possible implementation of the fifth aspect, in a third possible implementation of the fifth aspect, the feedback mode is a first feedback mode; the feedback type includes a first feedback type, a second feedback type, and a third feedback type; the first feedback type is corresponding to a first feedback period, the second feedback type is corresponding to a second feedback period, and the third feedback type is corresponding to a third feedback period; a feedback parameter of the first feedback type includes the indication information of the M CSI-RS resources, a feedback parameter of the second feedback type includes RIs and PMIs 1 that are obtained by means of measurement according to the M CSI-RS resources, and a feedback parameter of the third feedback type includes PMIs 2 and CQIs that are obtained by means of measurement according to the M CSI-RS resources.

With reference to the third possible implementation of the fifth aspect, in a fourth possible implementation of the fifth aspect, the first feedback period>the second feedback period>the third feedback period.

With reference to the second possible implementation of the fifth aspect, in a fifth possible implementation of the fifth aspect, the feedback mode is a first feedback mode; the feedback type includes a fourth feedback type and a fifth feedback type; the fourth feedback type is corresponding to a fourth feedback period, and the fifth feedback type is corresponding to a fifth feedback period; a feedback parameter of the fourth feedback type includes the indication information of the M CSI-RS resources, and RIs and PMIs 1 that are obtained by means of measurement according to the M CSI-RS resources, and a feedback parameter of the fifth feedback type includes PMIs 2 and CQIs that are obtained by means of measurement according to the M CSI-RS resources.

With reference to the fifth possible implementation of the fifth aspect, in a sixth possible implementation of the fifth aspect, the fourth feedback period>the fifth feedback period.

With reference to the second possible implementation of the fifth aspect, in a seventh possible implementation of the fifth aspect, the feedback mode is a first feedback mode; the feedback type includes a sixth feedback type, a seventh feedback type, and an eighth feedback type; the sixth feedback type is corresponding to a sixth feedback period, the seventh feedback type is corresponding to a seventh feedback period, and the eighth feedback type is corresponding to an eighth feedback period; a feedback parameter of the sixth feedback type includes the indication information of the M CSI-RS resources, a feedback parameter of the seventh feedback type includes RIs obtained by means of measurement according to the M CSI-RS resources, and a feedback parameter of the eighth feedback type includes PMIs 1, PMIs 2, and CQIs that are obtained by means of measurement according to the M CSI-RS resources.

With reference to the seventh possible implementation of the fifth aspect, in an eighth possible implementation of the fifth aspect, the sixth feedback period>the seventh feedback period>the eighth feedback period.

With reference to the second possible implementation of the fifth aspect, in a ninth possible implementation of the fifth aspect, the feedback mode is a first feedback mode; the feedback type includes a ninth feedback type and a tenth feedback type; the ninth feedback type is corresponding to a ninth feedback period, and the tenth feedback type is corresponding to a tenth feedback period; a feedback parameter of the ninth feedback type includes the indication information and RIs of the M CSI-RS resources, and a feedback parameter of the tenth feedback type includes PMIs 1, PMIs 2, and CQIs that are obtained by means of measurement according to the M CSI-RS resources.

With reference to the ninth possible implementation of the fifth aspect, in a tenth possible implementation of the fifth aspect, the ninth feedback period>the tenth feedback period.

With reference to any one of the second to the tenth possible implementations of the fifth aspect, in an eleventh possible implementation of the fifth aspect, the RIs of the M CSI-RS resources are obtained by means of measurement according to the M CSI-RS resources.

With reference to any one of the third to the tenth possible implementations of the fifth aspect, in a twelfth possible implementation of the fifth aspect, M is 1 in the first feedback mode.

With reference to the second possible implementation of the fifth aspect, in a thirteenth possible implementation of the fifth aspect, M≥2, it is assumed that PMIs 1 obtained by means of measurement according to the M CSI-RS resources are the same, and PMIs 2 obtained by means of measurement according to the CSI-RS resources are the same or different, a precoding matrix corresponding to the PMI 1 and the PMI 2 is obtained by means of measurement according to each CSI-RS resource, and an antenna quantity corresponding to the precoding matrix is a quantity of antenna ports included in each CSI-RS resource; and the feedback mode is a second feedback mode; the feedback type includes an eleventh feedback type, a twelfth feedback type, and a thirteenth feedback type; the eleventh feedback type is corresponding to an eleventh feedback period, the twelfth feedback type is corresponding to a twelfth feedback period, and the thirteenth feedback type is corresponding to a thirteenth feedback period; a feedback parameter of the eleventh feedback type includes RIs obtained by means of measurement according to the M CSI-RS resources, a feedback parameter of the twelfth feedback type includes the indication information and the PMIs 1 of the M CSI-RS resources, and a feedback parameter of the thirteenth feedback type includes the PMIs 2 and CQIs that are obtained by means of measurement according to the M CSI-RS resources, where a quantity of the PMIs 1 is 1, and if the PMIs 2 obtained by means of measurement according to the CSI-RS resources are the same, a quantity of the PMIs 2 is 1, or if the PMIs 2 obtained by means of measurement according to the CSI-RS resources are different, the PMIs 2 are M PMIs 2.

With reference to the thirteenth possible implementation of the fifth aspect, in a fourteenth possible implementation of the fifth aspect, the eleventh period>the twelfth period>the thirteenth period.

With reference to the second possible implementation of the fifth aspect, in a fifteenth possible implementation of the fifth aspect, M≥2, PMIs 1 of the CSI-RS resources are the same or different, and PMIs 2 of the CSI-RS resources are different; and the feedback mode is a second feedback mode; the feedback type includes a fourteenth feedback type, a fifteenth feedback type, a sixteenth feedback type, a seventeenth feedback type, and an eighteenth feedback type; the fourteenth feedback type is corresponding to a fourteenth feedback period, the fifteenth feedback type is corresponding to a fifteenth feedback period, the sixteenth feedback type is corresponding to a sixteenth feedback period, the seventeenth feedback type is corresponding to a seventeenth feedback period, and the eighteenth feedback type is corresponding to an eighteenth feedback period; a feedback parameter of the fourteenth feedback type includes RIs obtained by means of measurement according to the M CSI-RS resources, a feedback parameter of the fifteenth feedback type includes the indication information of the M CSI-RS resources and the PMIs 1 obtained by means of measurement according to the M CSI-RS resources, a feedback parameter of the sixteenth feedback type includes PMIs 2 obtained by means of measurement according to some of the M CSI-RS resources, a feedback parameter of the seventeenth feedback type includes PMIs 2 obtained by means of measurement according to remaining resources of the M CSI-RS resources, and a feedback parameter of the eighteenth feedback type includes CQIs obtained by means of measurement according to the M CSI-RS resources; where if the PMIs 1 obtained by means of measurement according to the CSI-RS resources are the same, a quantity of the PMIs 1 is 1, or if the PMIs 1 obtained by means of measurement according to the CSI-RS resources are different, the PMIs 1 are M PMIs 1.

With reference to the fifteenth possible implementation of the fifth aspect, in a sixteenth possible implementation of the fifth aspect, the fourteenth feedback period>the fifteenth feedback period>the sixteenth feedback period>the seventeenth feedback period>the eighteenth feedback period.

With reference to any one of the fifth aspect or the first to the sixteenth possible implementations of the fifth aspect, in a seventeenth possible implementation of the fifth aspect, M is notified by the base station to the UE, or is determined by the UE.

With reference to any one of the second to the sixteenth possible implementations of the fifth aspect, in an eighteenth possible implementation of the fifth aspect, the determining module is further configured to determine the feedback mode according to M.

With reference to the third possible implementation of the fifth aspect, in a nineteenth possible implementation of the fifth aspect, the feedback module is configured to feed back the first indication information and the second indication information in different feedback types.

With reference to the fifth aspect, in a twentieth possible implementation of the fifth aspect, the feedback module is specifically configured to aperiodically feed back the indication information of the M CSI-RS resources to the base station.

With reference to the third possible implementation of the fifth aspect, in a twenty-first possible implementation of the fifth aspect, the CSI further includes a precoding type index PTI, a precoding matrix indicator PMI 2 corresponding to a subband codeword W2, and a subband channel quality indicator CQI; and when the PTI=0, the feedback parameter included in the feedback type is a precoding matrix indicator PMI 2 corresponding to a wideband codeword W2, and a wideband channel quality indicator CQI; or when the PTI=1, the feedback parameter included in the feedback type is the precoding matrix indicator PMI 2 corresponding to the subband codeword W2, and the subband channel quality indicator CQI;

when PMI=0, the indication information is updated; or when PMI=1, the indication information is not updated; and a sequence of feeding back the PTI and the indication information may be one of the following sequences:

the PTI and the indication information are fed back at the same time; the PTI is fed back first, and then the indication information is fed back; or the indication information is fed back first, and then the PTI is fed back.

According to a sixth aspect, an embodiment of the present disclosure provides a base station, including:

a receiving module, configured to receive CSI of M CSI-RS resources and indication information of the M CSI-RS resources that are fed back by user equipment UE, where the M CSI-RS resources are selected by the UE from N CSI-RS resources, the N CSI-RS resources are configured by the base station and received by the UE, the CSI-RS resources include at least one port, N≥2, and N is an integer; and a precoding module, configured to perform precoding according to the M CSI-RS resources.

In a first possible implementation of the sixth aspect, the indication information of the M CSI-RS resources includes first indication information and/or second indication information, the first indication information is a value of M, and the second indication information is indexes of the M CSI-RS resources.

With reference to the sixth aspect or the first possible implementation of the sixth aspect, in a second possible implementation of the sixth aspect, CSI of each of the M CSI-RS resources includes: a rank indication RI, a precoding matrix indicator PMI 1 corresponding to a codeword W1, a precoding matrix indicator PMI 2 corresponding to a codeword W2, and a channel quality indicator CQI, the W1 and the W2 are respectively corresponding to W1 and W2 in a double codebook structure W, and W=W1*W2; and the receiving module is specifically configured to receive the CSI of the M CSI-RS resources and the indication information of the M CSI-RS resources that are fed back by the UE according to a feedback mode and a feedback type, where the feedback type refers to a feedback parameter fed back by the UE at a time at a feedback moment, and the feedback parameter includes at least one of the RI, the PMI 1, the PMI 2, the CQI, or the indication information.

With reference to the second possible implementation of the sixth aspect, in a third possible implementation of the sixth aspect, the feedback mode is a first feedback mode; the feedback type includes a first feedback type, a second feedback type, and a third feedback type; the first feedback type is corresponding to a first feedback period, the second feedback type is corresponding to a second feedback period, and the third feedback type is corresponding to a third feedback period; a feedback parameter of the first feedback type includes the indication information of the M CSI-RS resources, a feedback parameter of the second feedback type includes RIs and PMIs 1 that are obtained by means of measurement according to the M CSI-RS resources, and a feedback parameter of the third feedback type includes PMIs 2 and CQIs that are obtained by means of measurement according to the M CSI-RS resources.

With reference to the third possible implementation of the sixth aspect, in a fourth possible implementation of the sixth aspect, the first feedback period>the second feedback period>the third feedback period.

With reference to the second possible implementation of the sixth aspect, in a fifth possible implementation of the sixth aspect, the feedback mode is a first feedback mode; the feedback type includes a fourth feedback type and a fifth feedback type; the fourth feedback type is corresponding to a fourth feedback period, and the fifth feedback type is corresponding to a fifth feedback period; a feedback parameter of the fourth feedback type includes the indication information of the M CSI-RS resources, and RIs and PMIs 1 that are obtained by means of measurement according to the M CSI-RS resources, and a feedback parameter of the fifth feedback type includes PMIs 2 and CQIs that are obtained by means of measurement according to the M CSI-RS resources.

With reference to the fifth possible implementation of the sixth aspect, in a sixth possible implementation of the sixth aspect, the fourth feedback period>the fifth feedback period.

With reference to the second possible implementation of the sixth aspect, in a seventh possible implementation of the sixth aspect, the feedback mode is a first feedback mode; the feedback type includes a sixth feedback type, a seventh feedback type, and an eighth feedback type; the sixth feedback type is corresponding to a sixth feedback period, the seventh feedback type is corresponding to a seventh feedback period, and the eighth feedback type is corresponding to an eighth feedback period; a feedback parameter of the sixth feedback type includes the indication information of the M CSI-RS resources, a feedback parameter of the seventh feedback type includes RIs obtained by means of measurement according to the M CSI-RS resources, and a feedback parameter of the eighth feedback type includes PMIs 1, PMIs 2, and CQIs that are obtained by means of measurement according to the M CSI-RS resources.

With reference to the seventh possible implementation of the sixth aspect, in an eighth possible implementation of the sixth aspect, the sixth feedback period>the seventh feedback period>the eighth feedback period.

With reference to the second possible implementation of the sixth aspect, in a ninth possible implementation of the sixth aspect, the feedback mode is a first feedback mode; the feedback type includes a ninth feedback type and a tenth feedback type; the ninth feedback type is corresponding to a ninth feedback period, and the tenth feedback type is corresponding to a tenth feedback period; a feedback parameter of the ninth feedback type includes the indication information and RIs of the M CSI-RS resources, and a feedback parameter of the tenth feedback type includes PMIs 1, PMIs 2, and CQIs that are obtained by means of measurement according to the M CSI-RS resources.

With reference to the ninth possible implementation of the sixth aspect, in a tenth possible implementation of the sixth aspect, the ninth feedback period>the tenth feedback period.

With reference to any one of the second to the tenth possible implementations of the sixth aspect, in an eleventh possible implementation of the sixth aspect, the RIs of the M CSI-RS resources are obtained by means of measurement according to the M CSI-RS resources.

With reference to any one of the third to the tenth possible implementations of the sixth aspect, in a twelfth possible implementation of the sixth aspect, M is 1 in the first feedback mode.

With reference to the second possible implementation of the sixth aspect, in a thirteenth possible implementation of the sixteenth aspect, M≥2, it is assumed that PMIs 1 obtained by means of measurement according to the M CSI-RS resources are the same, and PMIs 2 obtained by means of measurement according to the CSI-RS resources are the same or different, a precoding matrix corresponding to the PMI 1 and the PMI 2 is obtained by means of measurement according to each CSI-RS resource, and an antenna quantity corresponding to the precoding matrix is a quantity of antenna ports included in each CSI-RS resource; and the feedback mode is a second feedback mode; the feedback type includes an eleventh feedback type, a twelfth feedback type, and a thirteenth feedback type; the eleventh feedback type is corresponding to an eleventh feedback period, the twelfth feedback type is corresponding to a twelfth feedback period, and the thirteenth feedback type is corresponding to a thirteenth feedback period; a feedback parameter of the eleventh feedback type includes RIs obtained by means of measurement according to the M CSI-RS resources, a feedback parameter of the twelfth feedback type includes the indication information and the PMIs 1 of the M CSI-RS resources, and a feedback parameter of the thirteenth feedback type includes the PMIs 2 and CQIs that are obtained by means of measurement according to the M CSI-RS resources, where a quantity of the PMIs 1 is 1, and if the PMIs 2 obtained by means of measurement according to the CSI-RS resources are the same, a quantity of the PMIs 2 is 1, or if the PMIs 2 obtained by means of measurement according to the CSI-RS resources are different, the PMIs 2 are M PMIs 2.

With reference to the thirteenth possible implementation of the sixth aspect, in a fourteenth possible implementation of the sixth aspect, the eleventh period>the twelfth period>the thirteenth period.

With reference to the second possible implementation of the sixth aspect, in a fifteenth possible implementation of the sixth aspect, M≥2, and it is assumed that PMIs 1 obtained by means of measurement according to the M CSI-RS resources are the same or different, and PMIs 2 obtained by means of measurement according to the CSI-RS resources are different; and the feedback mode is a second feedback mode; the feedback type includes a fourteenth feedback type, a fifteenth feedback type, a sixteenth feedback type, a seventeenth feedback type, and an eighteenth feedback type; the fourteenth feedback type is corresponding to a fourteenth feedback period, the fifteenth feedback type is corresponding to a fifteenth feedback period, the sixteenth feedback type is corresponding to a sixteenth feedback period, the seventeenth feedback type is corresponding to a seventeenth feedback period, and the eighteenth feedback type is corresponding to an eighteenth feedback period; a feedback parameter of the fourteenth feedback type includes RIs obtained by means of measurement according to the M CSI-RS resources, a feedback parameter of the fifteenth feedback type includes the indication information of the M CSI-RS resources and the PMIs 1 obtained by means of measurement according to the M CSI-RS resources, a feedback parameter of the sixteenth feedback type includes PMIs 2 obtained by means of measurement according to some of the M CSI-RS resources, a feedback parameter of the seventeenth feedback type includes PMIs 2 obtained by means of measurement according to remaining resources of the M CSI-RS resources, and a feedback parameter of the eighteenth feedback type includes CQIs obtained by means of measurement according to the M CSI-RS resources by using the PMIs 1 and the PMIs 2; where if the PMIs 1 obtained by means of measurement according to the CSI-RS resources are the same, a quantity of the PMIs 1 is 1, or if the PMIs 1 obtained by means of measurement according to the CSI-RS resources are different, the PMIs 1 are M PMIs 1.

With reference to the fifteenth possible implementation of the sixth aspect, in a sixteenth possible implementation of the sixth aspect, the fourteenth feedback period>the fifteenth feedback period>the sixteenth feedback period>the seventeenth feedback period>the eighteenth feedback period.

With reference to any one of the sixth aspect, or the first to the sixteenth possible implementations of the sixth aspect, in a seventeenth possible implementation of the sixth aspect, M≥2, PMIs 1 of the CSI-RS resources are the same or different, and PMIs 2 of the CSI-RS resources are different; and the feedback mode is a second feedback mode; the feedback type includes a fourteenth feedback type, a fifteenth feedback type, a sixteenth feedback type, a seventeenth feedback type, and an eighteenth feedback type; the fourteenth feedback type is corresponding to a fourteenth feedback period, the fifteenth feedback type is corresponding to a fifteenth feedback period, the sixteenth feedback type is corresponding to a sixteenth feedback period, the seventeenth feedback type is corresponding to a seventeenth feedback period, and the eighteenth feedback type is corresponding to an eighteenth feedback period; a feedback parameter of the fourteenth feedback type includes RIs obtained by means of measurement according to the M CSI-RS resources, a feedback parameter of the fifteenth feedback type includes the indication information of the M CSI-RS resources and the PMIs 1 obtained by means of measurement according to the M CSI-RS resources, a feedback parameter of the sixteenth feedback type includes PMIs 2 obtained by means of measurement according to some of the M CSI-RS resources, a feedback parameter of the seventeenth feedback type includes PMIs 2 obtained by means of measurement according to remaining resources of the M CSI-RS resources, and a feedback parameter of the eighteenth feedback type includes CQIs obtained by means of measurement according to the M CSI-RS resources; where if the PMIs 1 of the CSI-RS resources are the same, a quantity of the PMIs 1 is 1, or if the PMIs 1 of the CSI-RS resources are different, the PMIs 1 are M different PMIs 1.

With reference to any one of the sixth aspect, or the first to the sixteenth possible implementations of the sixth aspect, in a seventeenth possible implementation of the sixth aspect, the fourteenth feedback period>the fifteenth feedback period>the sixteenth feedback period>the seventeenth feedback period>the eighteenth feedback period.

With reference to any one of the sixth aspect, or the first to the sixteenth possible implementations of the sixth aspect, in a seventeenth possible implementation of the sixth aspect, M is notified by the UE to the base station, or is determined by the base station.

With reference to the second possible implementation of the sixth aspect, in an eighteenth possible implementation of the sixth aspect, the receiving, by the base station, indication information of the M CSI-RS resources fed back by UE includes:

receiving, by the base station, the first indication information and the second indication information that are fed back by the UE in different feedback types.

With reference to the sixth aspect, in a nineteenth possible implementation of the sixth aspect, the receiving, by the base station, indication information of the M CSI-RS resources fed back by UE includes:

receiving, by the base station, the indication information of the M CSI-RS resources that is aperiodically fed back by the UE according to triggering by the base station.

With reference to the second possible implementation of the sixth aspect, in a twentieth possible implementation of the sixth aspect, the CSI further includes a precoding type index PTI, a precoding matrix indicator PMI 2 corresponding to a subband codeword W2, and a subband channel quality indicator CQI; and when the PTI=0, the feedback parameter included in the feedback type is a precoding matrix indicator PMI 2 corresponding to a wideband codeword W2, and a wideband channel quality indicator CQI; or when the PTI=1, the feedback parameter included in the feedback type is the precoding matrix indicator PMI 2 corresponding to the subband codeword W2, and the subband channel quality indicator CQI;

when PMI=0, the indication information is updated; or when PMI=1, the indication information is not updated;

a sequence of feeding back the PTI and the indication information may be one of the following sequences:

the PTI and the indication information are fed back at the same time; the PTI is fed back first, and then the indication information is fed back; or the indication information is fed back first, and then the PTI is fed back; and the base station receives the indication information of the M CSI-RS resources that is a periodically fed back by the UE.

According to a seventh aspect, an embodiment of the present disclosure provides user equipment, including:

a determining module, configured to perform channel measurement according to reference signal resources including X antenna ports, to obtain channel state information CSI; and a feedback module, configured to feed back the channel state information CSI to a base station, where an antenna array corresponding to the X antenna ports includes at least two rows and two columns, and the CSI includes at least CSI of horizontal ports in the antenna array and CSI of $N_a$ vertical ports in the antenna array.

In a first possible implementation of the seventh aspect, a precoding matrix for the X antenna ports is $W = W1 \times W2$; the first codeword W1 is $$W_1(k, l) = \begin{bmatrix} \tilde{X}_H^k \otimes \tilde{X}_V^l & 0 \\ 0 & \tilde{X}_H^k \otimes \tilde{X}_V^l \end{bmatrix},$$

where $k=0, \ldots, M_a Q_H - 1$, $l=0, \ldots, N_a Q_V - 1$, $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^b-1}]$, $l=0, \ldots L$, $l'=f(l)$, where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^b-1}]$, $k=0, \ldots K$, $k'=f(k)$, where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $$X^l = \begin{bmatrix} 1 & e^{j2\pi \frac{l}{NQ}} & \ldots & e^{j2\pi \frac{(N-1)l}{NQ}} \end{bmatrix}^T, l = 0, \ldots, NQ - 1.$$

With reference to the first possible implementation of the seventh aspect, in a second possible implementation of the seventh aspect, the determining module is further configured to determine a rank of the antenna array corresponding to $M_a \times N_a \times 2$ ports, a group number k of a fixed beam group $\tilde{X}_H^k$ in the horizontal dimension of the antenna array, and a group number l of a fixed beam group $\tilde{X}_V^l$ in the vertical dimension of the antenna array, so that the UE generates a precoding matrix according to k, l, and the second codeword W2, and determines a channel quality indicator CQI according to the precoding matrix, where the channel state information includes the rank, k, l, the CQI, and a precoding matrix indicator PMI 2 corresponding to the second codeword W2; and the feedback module is specifically configured to feed back, according to a feedback type, the rank, k, l, and the CQI to the base station, where the feedback type refers to a feedback parameter fed back by the UE at a time at a feedback moment, and the feedback parameter includes at least one of the rank, k, l, the PMI 2, or the CQI.

With reference to the second possible implementation of the seventh aspect, in a third possible implementation of the seventh aspect, the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes k, a feedback parameter of the third feedback type includes l, a feedback parameter of the fourth feedback type includes the PMI 2 corresponding to the second codeword W2, and a feedback parameter of the fifth feedback type includes the CQI.

With reference to the third possible implementation of the seventh aspect, in a second possible implementation of the seventh aspect, the first feedback period>the second feedback period>the fourth feedback period>the fifth feedback period, or the first feedback period>the third feedback period>the fourth feedback period>the fifth feedback period.

In a fifth possible implementation of the seventh aspect, $$W = W1 \times W3;$$

the first codeword W1 is $$W_1(k, l) = \begin{bmatrix} \tilde{X}_H^k * W_2^H \otimes \tilde{X}_V^l * W_2^V & 0 \\ 0 & \tilde{X}_H^k * W_2^H \otimes \tilde{X}_V^l * W_2^V \end{bmatrix},$$

where $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^p-1}]$, l=0, ... L, l'=f(l), where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^p-1}]$, k=0, ... K, k'=f(k), where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension;

$W_2^H$ is a second precoding matrix in the horizontal dimension, and is used to perform column selection for $\tilde{X}_H^k$, $W_2^V$ is a second precoding matrix in the vertical dimension, and is used to perform column selection for $\tilde{X}_V^l$, and W3 is used to adjust phases of the two groups of antennas of W1; and the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes the first precoding matrix corresponding to the horizontal dimension of the antenna array, a feedback parameter of the third feedback type includes the first precoding matrix corresponding to the vertical dimension, a feedback parameter of the fourth feedback type includes the second precoding matrix corresponding to the horizontal dimension, a feedback parameter of the fifth feedback type includes the second precoding matrix corresponding to the vertical dimension, and a feedback parameter of a sixth feedback type includes a CQI; the first feedback period>the second feedback period>the third feedback period>the sixth feedback period, or the first feedback period>the third feedback period>the fourth feedback period>the sixth feedback period.

According to an eighth aspect, an embodiment of the present disclosure provides a base station, including:

a receiving module, configured to receive channel state information CSI fed back by user equipment UE, where the CSI is obtained by the user equipment by means of channel measurement according to reference signal resources including X antenna ports, an antenna array corresponding to the X antenna ports includes at least two rows and two columns, and the CSI includes at least CSI of $M_a$ horizontal ports in the antenna array and CSI of $N_a$ vertical ports in the antenna array; and a precoding module, configured to perform precoding according to the channel state information.

In a first possible implementation of the eighth aspect, a precoding matrix for the X antenna ports is $W=W1\times W2$;

the first codeword W1 is $$W_1(k, l) = \begin{bmatrix} \tilde{X}_H^k \otimes \tilde{X}_V^l & 0 \\ 0 & \tilde{X}_H^k \otimes \tilde{X}_V^l \end{bmatrix},$$

where k=0, . . . , $M_a Q_H - 1$, l=0, . . . , $N_a Q_V - 1$, $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^p-1}]$, l=0, ... L, l'=f(l), where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^p-1}]$, k=0, ... K, k'=f(k), where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $$X^l = \begin{bmatrix} 1 & e^{j2\pi \frac{l}{NQ}} & \cdots & e^{j2\pi \frac{(N-1)l}{NQ}} \end{bmatrix}^T, l = 0, \ldots, NQ - 1.$$

With reference to the first possible implementation of the eighth aspect, in a second possible implementation of the eighth aspect, the channel state information includes a rank of the antenna array corresponding to $M_a \times N_a \times 2$ ports that is determined by the UE, a group number k of a fixed beam group $\tilde{X}_H^k$ in the horizontal dimension of the antenna array that is determined by the UE, a group number l of a fixed beam group $\tilde{X}_V^l$ in the vertical dimension of the antenna array that is determined by the UE, and a channel quality indicator CQI determined by the UE; and the receiving module is specifically configured to receive the rank, k, l, the CQI, and a precoding matrix indicator PMI 2 corresponding to the second codeword W2 that are fed back by the UE according to the double codebook structure and a feedback type, where the feedback type refers to a feedback parameter fed back by the UE at a time at a feedback moment, and the feedback parameter includes at least one of the rank, k, l, the PMI 2, or the CQI.

With reference to the second possible implementation of the eighth aspect, in a third possible implementation of the eighth aspect, the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes k, a feedback parameter of the third feedback type includes l, a feedback parameter of the fourth feedback type includes the PMI 2 corresponding to the second codeword W2, and a feedback parameter of the fifth feedback type includes the CQI.

With reference to the third possible implementation of the eighth aspect, in a fourth possible implementation of the eighth aspect, the first feedback period>the second feedback period>the fourth feedback period>the fifth feedback period, or the first feedback period>the third feedback period>the fourth feedback period>the fifth feedback period.

In a fifth possible implementation of the eighth aspect, W=W1×W3;

the first codeword W1 is $$W_1(k,l) = \begin{bmatrix} \tilde{X}_H^k * W_2^H \otimes \tilde{X}_V^l * W_2^V & 0 \\ 0 & \tilde{X}_H^k * W_2^H \otimes \tilde{X}_V^l * W_2^V \end{bmatrix},$$

where $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^p-1}]$, l=0, . . . L, l'=f(l), where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^p-1}]$, k=0, . . . K, k'=f(k), where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension;

$W_2^H$ is a second precoding matrix in the horizontal dimension, and is used to perform column selection for $\tilde{X}_H^k$, $W_2^V$ is a second precoding matrix in the vertical dimension, and is used to perform column selection for $\tilde{X}_V^l$, and W3 is used to adjust phases of the two groups of antennas of W1; and the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes the first precoding matrix corresponding to the horizontal dimension of the antenna array, a feedback parameter of the third feedback type includes the first precoding matrix corresponding to the vertical dimension, a feedback parameter of the fourth feedback type includes the second precoding matrix corresponding to the horizontal dimension, a feedback parameter of the fifth feedback type includes the second precoding matrix corresponding to the vertical dimension, and a feedback parameter of a sixth feedback type includes a CQI; the first feedback period>the second feedback period>the third feedback period>the sixth feedback period, or the first feedback period>the third feedback period>the fourth feedback period>the sixth feedback period.

According to a ninth aspect, an embodiment of the present disclosure provides user equipment, including a processor and a memory, where the memory stores an execution instruction, the processor communicates with the memory when the user equipment runs, and the processor executes the execution instruction to enable the user equipment to execute any one of the first aspect or the first to the twenty-first possible implementations of the first aspect.

According to a tenth aspect, an embodiment of the present disclosure provides a base station, including a processor and a memory, where the memory stores an execution instruction, the processor communicates with the memory when the base station runs, and the processor executes the execution instruction to enable the base station to execute any one of the second aspect or the first to the twentieth possible implementations of the second aspect.

According to an eleventh aspect, an embodiment of the present disclosure provides user equipment, including a processor and a memory, where the memory stores an execution instruction, the processor communicates with the memory when the user equipment runs, and the processor executes the execution instruction to enable the user equipment to execute any one of the third aspect or the first to the fifth possible implementations of the third aspect.

According to a twelfth aspect, an embodiment of the present disclosure provides a base station, including a processor and a memory, where the memory stores an execution instruction, the processor communicates with the memory when the base station runs, and the processor executes the execution instruction to enable the base station to execute any one of the fourth aspect or the first to the fifth possible implementations of the fourth aspect.

According to the channel state information feedback method, the user equipment, and the base station that are provided in the embodiments of the present disclosure, the user equipment determines the N CSI-RS resources according to a quantity N, configured by the base station, of CSI-RS resources that need to be fed back; performs channel estimation on the port included in the N CSI-RS resources, to obtain the channel state information in the horizontal dimension; then selects the M CSI-RS resources from the N CSI-RS resources; and feeds back the channel state information of the M CSI-RS resources in the horizontal dimension and the indication information of the M CSI-RS resources to the base station, so that the base station determines channel state information in the vertical dimension according to the indication information, so as to finally obtain the channel state information in the two dimensions, thereby resolving a problem that channel state information in only a horizontal dimension is fed back during conventional channel estimation.

BRIEF DESCRIPTION OF THE DRAWINGS

FIG. 6 is a schematic diagram of a first manner and a second manner of a sub-mode 1 of a feedback mode 1-1 in a channel state information feedback method according to the present disclosure;

FIG. 7 is a schematic diagram of a first manner and a second manner of a sub-mode 2 of a feedback mode 1-1 in a channel state information feedback method according to the present disclosure;

FIG. 9 is a schematic diagram of a sub-mode 3 of a feedback mode 1-1 in a channel state information feedback method according to the present disclosure;

FIG. 10 is a schematic diagram of a feedback mode 2-1 in a channel state information feedback method according to the present disclosure;

FIG. 11A to FIG. 11E are a schematic diagram of a channel state information feedback method according to the present disclosure;

DETAILED DESCRIPTION

Figure 1A:
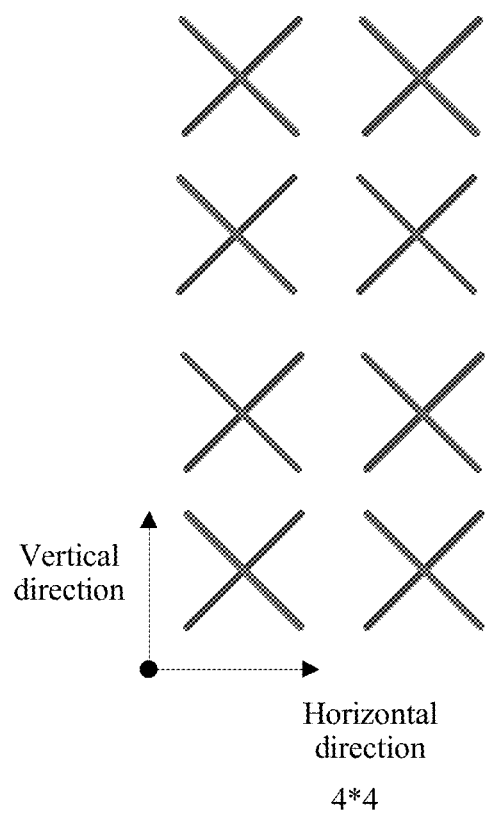
FIG. 1A is a schematic diagram of a 4×4 antenna array applicable to the embodiments of the present disclosure.
Figure 1B:
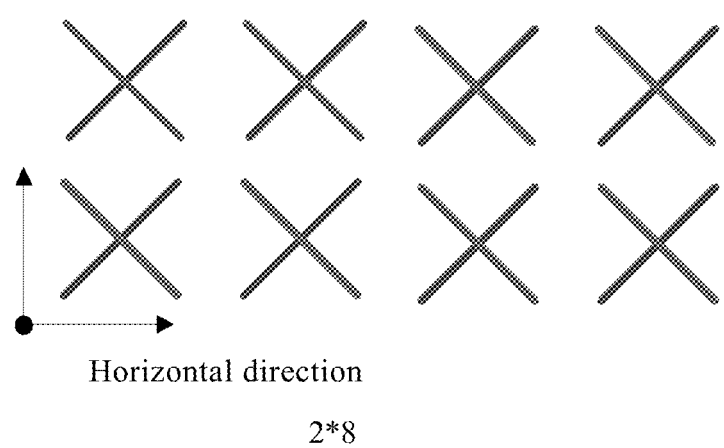
FIG. 1B is a schematic diagram of a 2×8 antenna array applicable to the embodiments of the present disclosure.
Figure 1C:
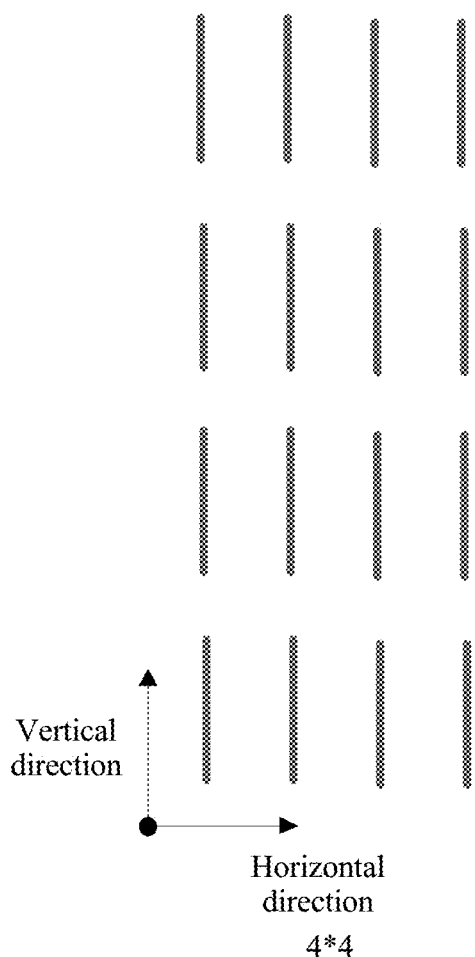
FIG. 1C is a schematic diagram of another 4×4 antenna array applicable to the embodiments of the present disclosure.
Figure 2:
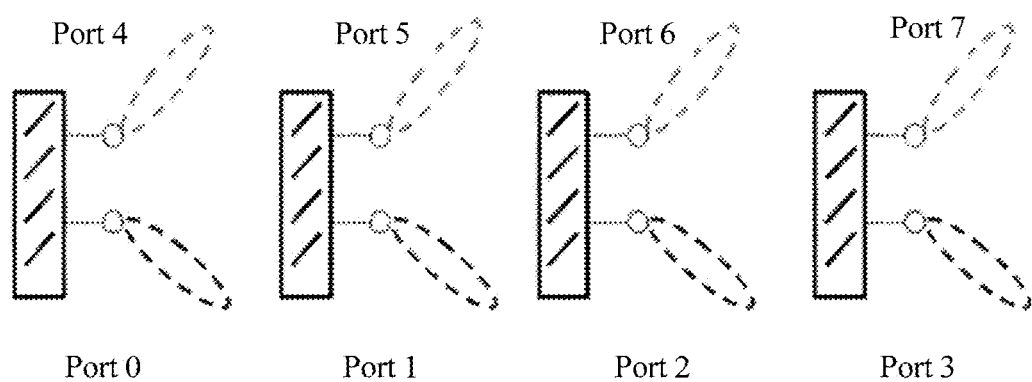
FIG. 2 is a schematic diagram of beam directions and CSI-RS resource ports that are applicable to the embodiments of the present disclosure.

FIG. 1A is a schematic diagram of a 4×4 antenna array applicable to the embodiments of the present disclosure, FIG. 1B is a schematic diagram of a 2×8 antenna array applicable to the embodiments of the present disclosure, and FIG. 1C is a schematic diagram of another 4×4 antenna array applicable to the embodiments of the present disclosure. Refer to FIG. 1A to FIG. 1C. In the embodiments of the present disclosure, beamforming may be performed for an AAS antenna array in both a horizontal dimension and a vertical dimension. During beamforming in the vertical dimension, different beams (beam) may be formed in the AAS antenna array in the vertical dimension. Different directions of each beam are corresponding to different CSI-RS resource ports (port), and the different CSI-RS resource ports may be different ports of one CSI-RS resource, or may be ports of different CSI-RS resources. For details, refer to FIG. 2. FIG. 2 is a schematic diagram of beam directions and CSI-RS resource ports that are applicable to the embodiments of the present disclosure.

As shown in FIG. 2, CSI-RS resource ports 0 to 3 are configured for beams in a direction that are formed in the vertical dimension in the AAS antenna array, and CSI-RS resource ports 4 to 7 are configured for beams in another direction.

For a 3D beamforming technology, during channel estimation, in addition to performing channel estimation on a channel in a horizontal dimension, user equipment needs to perform channel estimation on the channel in a vertical dimension. It can be learned from FIG. 1A to FIG. 1C and FIG. 2 that beams in different directions have different CSI-RS resources in the vertical dimension. Obviously, a conventional channel estimation method that supports channel estimation in only a horizontal dimension cannot be applicable to the 3D beamforming technology. Therefore, how to propose a channel state information feedback method becomes a problem to be urgently resolved in the industry.

Figure 3:
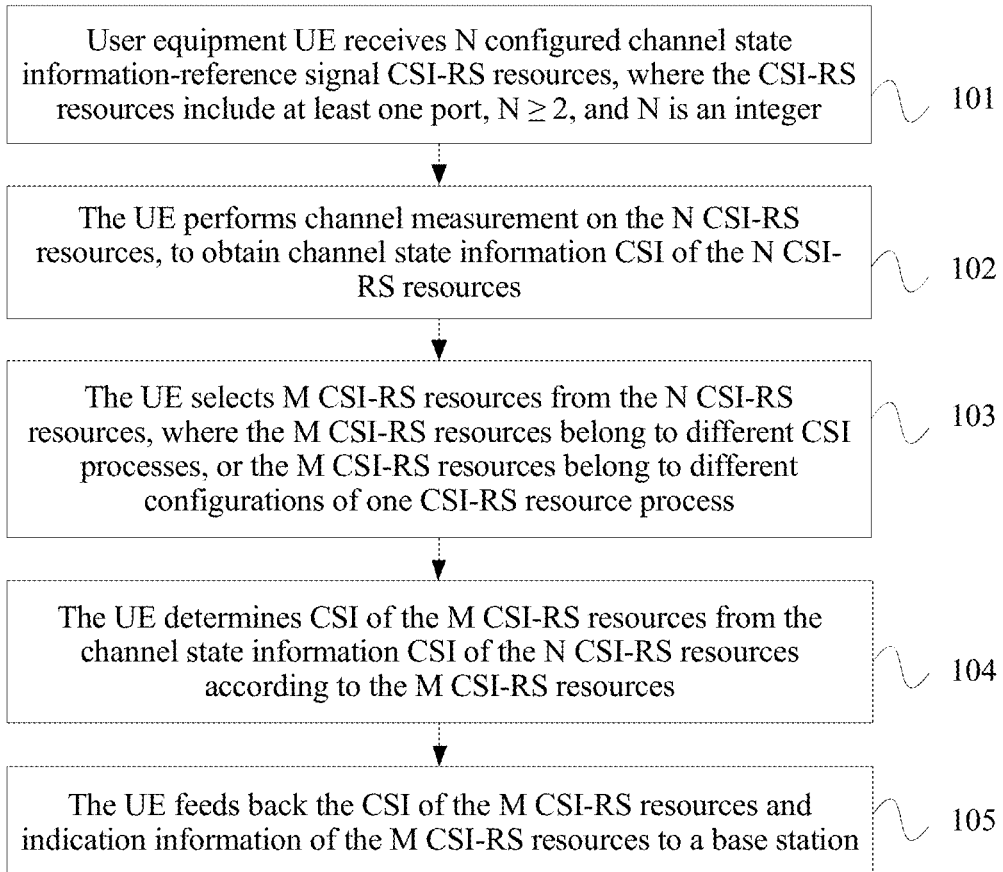
FIG. 3 is a flowchart of Embodiment 1 of a channel state information feedback method according to the present disclosure.

FIG. 3 is a flowchart of Embodiment 1 of a channel state information feedback method according to the present disclosure. This embodiment is executed by user equipment (UE), and is applicable to a scenario, in the 3D beamforming technology, in which channel estimation needs to be performed. Specifically, this embodiment includes the following steps:

101. The user equipment UE receives N configured channel state information-reference signal CSI-RS resources, where the CSI-RS resources include at least one port, N≥2, and N is an integer.

In this step, the UE receives the N configured CSI-RS resources. N is a quantity of CSI-RS resources that is configured by a base station for the UE in advance. The UE selects some or all of the CSI-RS resources for channel measurement. For example, when N=2, the UE selects one or two CSI-RS resources, measures the one or two CSI-RS resources to obtain channel state information, and feeds back the channel state information. For another example, when N=3, the UE selects one, two, or three CSI-RS resources, measures the selected CSI-RS resource/CSI-RS resources to obtain channel state information, and feeds back the channel state information to the base station.

102. The UE performs channel measurement on the N CSI-RS resources, to obtain channel state information CSI of the N CSI-RS resources.

In this step, the UE performs channel estimation on the port included in the N determined CSI-RS resources, to obtain the channel state information CSI of the N CSI-RS resources. There may be one, two, four, or eight ports included in the CSI-RS resources. CSI of each CSI-RS resource may include, for example, a CQI, a PMI, or an RI. The CQI is used by a user to schedule and adjust a modulation and coding scheme (MCS) and the like. The PMI is used for beamforming, multi-user scheduling, and the like, and includes a PMI 1 corresponding to a first codeword W1 and a PMI 2 corresponding to a second codeword W2. The RI is used to determine a quantity of layers used for data transmission and the like.

103. The UE selects M CSI-RS resources from the N CSI-RS resources, where the M CSI-RS resources belong to different CSI processes, or the M CSI-RS resources belong to different configurations of one CSI-RS resource process.

The UE selects the M CSI-RS resources from the N configured CSI-RS resources. A selection principle is that the M CSI-RS resources belong to different CSI processes (process), or the M CSI-RS resources belong to different configurations (configuration) of one CSI-RS resource process (process).

104. The UE determines CSI of the M CSI-RS resources from the channel state information CSI of the N CSI-RS resources according to the M CSI-RS resources.

In this step, M pieces of CSI corresponding to the M CSI-RS resources are selected from the CSI of the N CSI-RS resources in 102 according to the selected M CSI-RS resources in 103.

105. The UE feeds back the CSI of the M CSI-RS resources and indication information of the M CSI-RS resources to a base station.

In this embodiment of the present disclosure, the CSI of the M CSI-RS resources is equivalent to CSI in a horizontal dimension; the base station stores the indication information of the M CSI-RS resources, and the base station may determine the CSI in the vertical dimension according to indexes of the M CSI-RS resources. Therefore, CSI in both the horizontal dimension and the vertical dimension can be obtained.

According to the channel state information feedback method provided in this embodiment of the present disclosure, the user equipment determines the N CSI-RS resources according to the quantity N, configured by the base station, of CSI-RS resources that need to be fed back; performs channel estimation on the port included in the N CSI-RS resources, to obtain the channel state information in the horizontal dimension; then selects the M CSI-RS resources from the N CSI-RS resources; and feeds back the channel state information of the M CSI-RS resources in the horizontal dimension and the indication information of the M CSI-RS resources to the base station, so that the base station determines the channel state information in the vertical dimension according to the indication information, so as to finally obtain the channel state information in the two dimensions, thereby resolving a problem that channel state information in only a horizontal dimension is fed back during conventional channel estimation.

Figure 4:
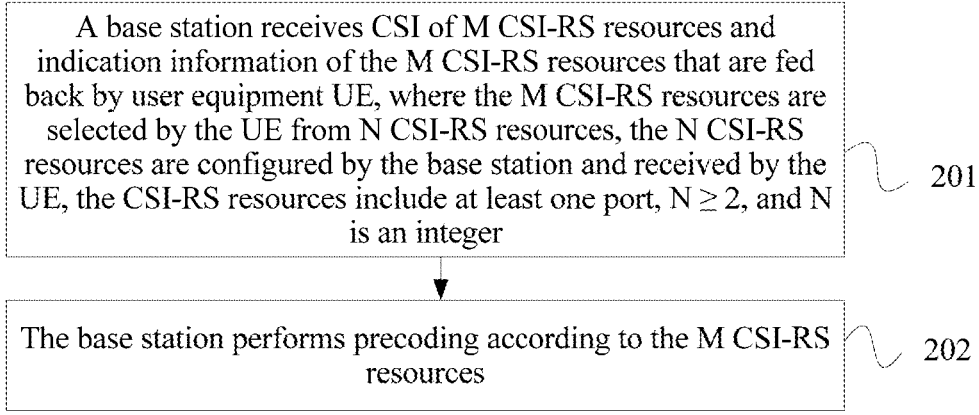
FIG. 4 is a flowchart of Embodiment 2 of a channel state information feedback method according to the present disclosure.

FIG. 4 is a flowchart of Embodiment 2 of the channel state information feedback method according to the present disclosure. This embodiment is executed by a base station, and is applicable to a scenario, in the 3D beamforming technology, in which channel estimation needs to be performed. Specifically, this embodiment includes the following steps:

201. A base station receives CSI of M CSI-RS resources and indication information of the M CSI-RS resources that are fed back by user equipment UE, where the M CSI-RS resources are selected by the UE from N CSI-RS resources, the N CSI-RS resources are configured by the base station and received by the UE, the CSI-RS resources include at least one port, N≥2, and N is an integer.

In this step, for specific descriptions of N, the port of the CSI-RS resources, the channel state information CSI, and the like, refer to the embodiment in FIG. 3, and details are not described herein again.

202. The base station performs precoding according to the M CSI-RS resources.

According to the channel state information feedback method provided in this embodiment of the present disclosure, the base station receives the channel state information of the M CSI-RS resources in the horizontal dimension and the indication information of the M CSI-RS resources that are fed back by the user equipment, and determines channel state information in a vertical dimension according to the indication information, so as to finally obtain the channel state information in the two dimensions, thereby resolving a problem that channel state information in only a horizontal dimension is fed back during conventional channel estimation Optionally, in the foregoing embodiment, the indication information of the M CSI-RS resources includes first indication information and/or second indication information, the first indication information is a value of M, and the second indication information is indexes of the M CSI-RS resources.

Optionally, in the foregoing embodiment, CSI of each of the M CSI-RS resources includes: a rank indication RI, a precoding matrix indicator PMI 1 corresponding to a wideband codeword W1, a precoding matrix indicator PMI 2 corresponding to a wideband codeword W2, and a wideband channel quality indicator CQI. The feeding back, by the UE, the CSI of the M CSI-RS resources and indication information of the M CSI-RS resources to a base station includes: feeding back, by the UE, the CSI of the M CSI-RS resources and the indication information of the M CSI-RS resources to the base station according to a feedback mode and a feedback type, where the feedback type refers to a feedback parameter fed back by the UE at a time at a feedback moment, and the feedback parameter includes at least one of the RI, the PMI 1, the PMI 2, the CQI, or the indication information.

In LTE, four feedback modes are defined: a feedback mode 1-0, a feedback mode 2-0, a feedback mode 1-1, and a feedback mode 2-1. In the feedback mode 1-1 and the feedback mode 2-1, the UE needs to feed back a CQI, an RI, and a PMI. The following describes in detail a feedback manner in which the UE feeds back the channel state information of the M CSI-RS resources and the indication information of the M CSI-RS resources to the base station in the feedback mode 1-1 and the feedback mode 2-1.

1. A First Manner (Submode 1-1) of a Submode 1 of the Feedback Mode 1-1.

In this feedback manner, M=1, the beam indication (BI) is independently fed back, the RI and the W1 are fed back at the same time, and the W2 and the CQI are fed back at the same time.

Specifically, the feedback type includes a first feedback type, a second feedback type, and a third feedback type; the first feedback type is corresponding to a first feedback period, the second feedback type is corresponding to a second feedback period, and the third feedback type is corresponding to a third feedback period; a feedback parameter of the first feedback type includes the indication information of the M CSI-RS resources, a feedback parameter of the second feedback type includes RIs and PMIs 1 that are obtained by means of measurement according to the M CSI-RS resources, and a feedback parameter of the third feedback type includes PMIs 2 and CQIs that are obtained by means of measurement according to the M CSI-RS resources. The first feedback period>the second feedback period>the third feedback period.

Figure 5:
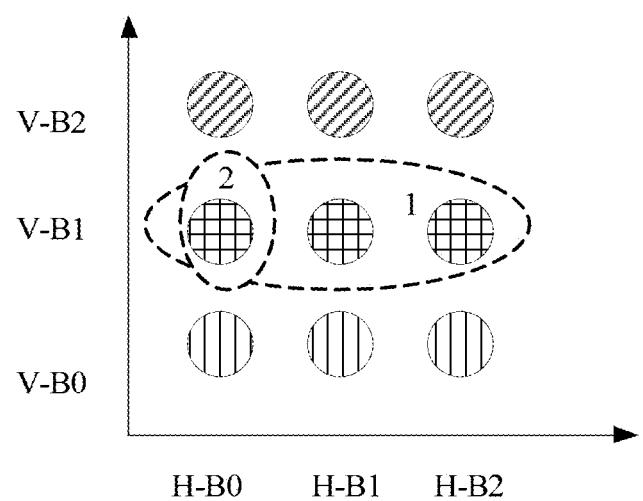
FIG. 5 is a schematic diagram of a channel state information feedback method according to the present disclosure.

FIG. 5 is a schematic diagram of the channel state information feedback method according to the present disclosure. As shown in FIG. 5, it is assumed that there are three CSI-RS resources, which are respectively corresponding to three vertical beam directions: V-B0 (as shown in a pattern filled with vertical lines in FIG. 5), V-B1 (as shown in a pattern filled with grids in FIG. 5), and V-B2 (as shown in a pattern filled with slashes in FIG. 5). When N=1, the UE determines one CSI-RS resource, that is, determines one vertical beam direction, then performs channel estimation on X ports included in the CSI-RS resource to obtain channel state information in a horizontal dimension, and finally feeds back the channel state information in the horizontal dimension and an index to the base station. For example, if the CSI-RS resource determined by the UE is a CSI-RS resource corresponding to V-B1, in this vertical direction, the channel state information in the horizontal dimension may be H-B0, H-B1, or H-B2, as shown in the dashed elliptical circle 1 in FIG. 5. In this case, the UE performs channel estimation on X ports included in the CSI-RS resource corresponding to V-B1, to obtain the channel state information in the horizontal dimension, such as H-B0 (as shown in the dashed elliptical circle 2 in FIG. 5).

FIG. 6 is a schematic diagram of the first manner and a second manner of the sub-mode 1 of the feedback mode 1-1 in the channel state information feedback method according to the present disclosure.

Referring to FIG. 6, on a physical uplink control channel (PUCCH), in the first manner of the submode 1 of the feedback mode 1-1, the BI is fed back in a subframe 0, the RI and the PMI 1 are fed back in a subframe 2, and the PMI 2 and the CQI are fed back in a subframe 9.

It should be noted that the feedback shown in FIG. 6 is periodic feedback. However, the present disclosure is not limited to this. In another feasible implementation, for example, on a physical uplink shared channel (PUSCH), the feedback may also be aperiodic feedback.

2. The Second Manner (Submode 1-2) of the Submode 1 of the Feedback Mode 1-1.

In this feedback manner, M=1, the BI, the RI, and the PMI 1 are fed back at the same time, and the PMI 2 and the CQI are fed back at the same time.

Specifically, the feedback mode is a first feedback mode; the feedback type includes a fourth feedback type and a fifth feedback type; the fourth feedback type is corresponding to a fourth feedback period, and the fifth feedback type is corresponding to a fifth feedback period; a feedback parameter of the fourth feedback type includes the indication information of the M CSI-RS resources, and RIs and PMIs 1 that are obtained by means of measurement according to the M CSI-RS resources, and a feedback parameter of the fifth feedback type includes PMIs 2 and CQIs that are obtained by means of measurement according to the M CSI-RS resources. The fourth feedback period>the fifth feedback period.

Referring to FIG. 6 again, on a physical uplink control channel (PUCCH), in the second manner of the submode 1 of the feedback mode 1-1, the BI, the RI, and the PMI 1 are fed back in a subframe 0, and the PMI 2 and the CQI are fed back in a subframe 4. This feedback process is a periodic feedback process. Alternatively, aperiodic feedback may be performed.

3. A First Manner (Submode 2-1) of a Submode 2 of the Feedback Mode 1-1.

In this feedback manner, M=1, the BI is independently fed back, the RI is independently fed back, and the PMI 1, the PMI 2, and the CQI are fed back at the same time.

Specifically, the feedback mode is a first feedback mode; the feedback type includes a sixth feedback type, a seventh feedback type, and an eighth feedback type; the sixth feedback type is corresponding to a sixth feedback period, the seventh feedback type is corresponding to a seventh feedback period, and the eighth feedback type is corresponding to an eighth feedback period; a feedback parameter of the sixth feedback type includes the indication information of the M CSI-RS resources, a feedback parameter of the seventh feedback type includes RIs obtained by means of measurement according to the M CSI-RS resources, and a feedback parameter of the eighth feedback type includes PMIs 1, PMIs 2, and CQIs that are obtained by means of measurement according to the M CSI-RS resources. The sixth feedback period>the seventh feedback period>the eighth feedback period.

FIG. 7 is a schematic diagram of the first manner and a second manner of the sub-mode 2 of the feedback mode 1-1 in the channel state information feedback method according to the present disclosure.

Referring to FIG. 7, in the first manner of the submode 2 of the feedback mode 1-1, the BI is fed back in a subframe 0, the RI is fed back in a subframe 2, and the PMI 1, the PMI 2, and the CQI are fed back in a subframe 9. The feedback process is a periodic feedback process. Alternatively, aperiodic feedback may be performed.

4. The Second Manner (Submode 1-2) of the Submode 2 of the Feedback Mode 1-1.

In this feedback manner, M=1, the BI is independently fed back, the RI is independently fed back, and the PMI 1, the PMI 2, and the CQI are fed back at the same time.

Specifically, the feedback mode is a first feedback mode; the feedback type includes a ninth feedback type and a tenth feedback type; the ninth feedback type is corresponding to a ninth feedback period, and the tenth feedback type is corresponding to a tenth feedback period; a feedback parameter of the ninth feedback type includes the indication information and RIs of the M CSI-RS resources, and a feedback parameter of the tenth feedback type includes PMIs 1, PMIs 2, and CQIs that are obtained by means of measurement according to the M CSI-RS resources. The ninth feedback period>the tenth feedback period.

Referring to FIG. 7 again, in the second manner of the submode 2 of the feedback mode 1-1, the BI and the RI are fed back in a subframe 0, and the PMI 1, the PMI 2, and the CQI are fed back in a subframe 4. The feedback process is a periodic feedback process. Alternatively, aperiodic feedback may be performed.

In the foregoing first to fourth feedback manners, the RIs of the M CSI-RS resources are obtained according to the M CSI-RS resources, and M is 1 in the first feedback mode.

5. A First Manner (Submode 3-1) of a Submode 3 of the Feedback Mode 1-1.

Generally, in various feedback manners of the submode 3, M≥2, and M is an integer.

Figure 8A:
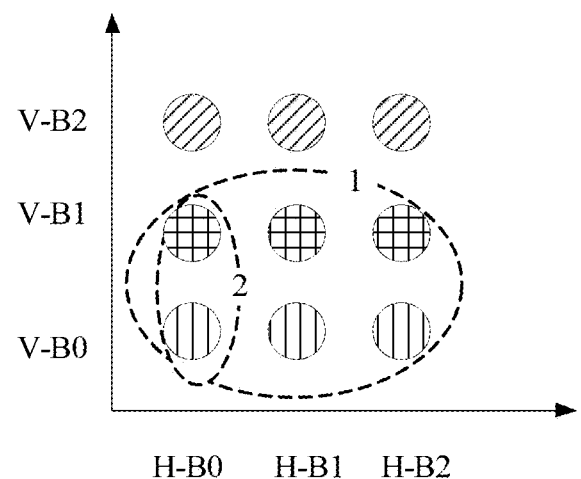
FIG. 8A is another schematic diagram of a channel state information feedback method according to the present disclosure.
Figure 8B:
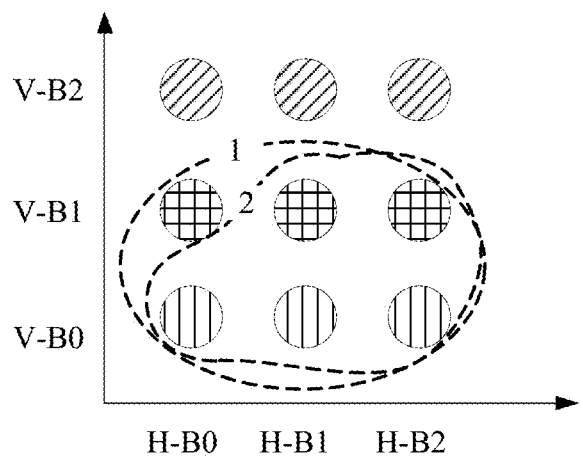
FIG. 8B is another schematic diagram of a channel state information feedback method according to the present disclosure.

FIG. 8A is another schematic diagram of the channel state information feedback method according to the present disclosure. FIG. 8B is another schematic diagram of the channel state information feedback method according to the present disclosure. As shown in FIG. 8A and FIG. 8B, it is assumed that there are three CSI-RS resources, which are respectively corresponding to three vertical beam directions: V-B0 (as shown in a pattern filled with vertical lines in the figure), V-B1 (as shown in a pattern filled with grids in the figure), and V-B2 (as shown in a pattern filled with slashes in the figure). When N=2, the UE determines two CSI-RS resources, that is, determines two vertical beam directions, then performs channel estimation on X ports included in the two CSI-RS resources to obtain channel state information in a horizontal dimension, and finally feeds back the channel state information in the horizontal dimension and a beam index to the base station. For example, if the CSI-RS resources determined by the UE are CSI-RS resources corresponding to V-B1 and V-B0, in this vertical direction, the channel state information in the horizontal dimension may be H-B0, H-B1, or H-B2, as shown in dashed elliptical circles 1 in FIG. 8A and FIG. 8B. In this case, the UE performs channel estimation on X ports included in the CSI-RS resources corresponding to V-B1 and V-B0, to obtain the channel state information in the horizontal dimension, such as H-B0, as shown in the dashed elliptical circle 2 in FIG. 8A. Alternatively, the UE performs channel estimation on X ports included in the CSI-RS resources corresponding to V-B1 and V-B0, to obtain the channel state information in the horizontal dimension, such as H-B0, H-B1, and H-B2, as shown in the dashed elliptical circle 2 in FIG. 8B.

FIG. 9 is a schematic diagram of the sub-mode 3 of the feedback mode 1-1 in the channel state information feedback method according to the present disclosure.

In a first feedback manner (submode 3-1) of the submode 3 of the feedback mode 1-1, M≥2, CSI of each of the M CSI-RS resources includes: a rank indication RI, a precoding matrix indicator PMI 1 corresponding to a wideband codeword W1, a precoding matrix indicator PMI 2 corresponding to a wideband codeword W2, and a wideband channel quality indicator CQI, PMIs 1 of the CSI-RS resources are the same, and PMIs 2 of the CSI-RS resources are the same. In this case, the UE first feeds back the RI, and then feeds back the BI, the PMI 1, the PMI 2, and the CQI. The RI is independently fed back, the BI and the PMI 1 are fed back together, and the PMI 2 and the CQI are fed back together. The BI is respective BI corresponding to the M CSI-RS resources.

Specifically, the feedback mode is a second feedback mode; the feedback type includes an eleventh feedback type, a twelfth feedback type, and a thirteenth feedback type; the eleventh feedback type is corresponding to an eleventh feedback period, the twelfth feedback type is corresponding to a twelfth feedback period, and the thirteenth feedback type is corresponding to a thirteenth feedback period; a feedback parameter of the eleventh feedback type includes RIs obtained by means of measurement according to the M CSI-RS resources, a feedback parameter of the twelfth feedback type includes the indication information and the PMIs 1 of the M CSI-RS resources, and a feedback parameter of the thirteenth feedback type includes the PMIs 2 and CQIs that are obtained by means of measurement according to the M CSI-RS resources, where a quantity of the PMIs 1 is 1, and if the PMIs 2 of the CSI-RS resources are the same, a quantity of the PMIs 2 is 1.

Referring to FIG. 9, in the first manner of the submode 3 of the feedback mode 1-1, the RI is fed back in a subframe 0, the BI and the W1 are fed back in a subframe 2, and the W2 and the CQI are fed back in a subframe 4. The feedback process is a periodic feedback process. Alternatively, aperiodic feedback may be performed.

6. A Second Manner (Submode 3-2) of the Submode 3 of the Feedback Mode 1-1.

In this feedback mode, M≥2, CSI of each of the M CSI-RS resources includes: a rank indication RI, a precoding matrix indicator PMI 1 corresponding to a wideband codeword W1, a precoding matrix indicator PMI 2 corresponding to a wideband codeword W2, and a wideband channel quality indicator CQI, PMIs 1 of the CSI-RS resources are the same, and PMIs 2 of the CSI-RS resources are different. In this case, the UE first feeds back the RI, and then feeds back the BI, the PMI 1, the PMI 2, and the CQI. The RI is independently fed back, the BI and the PMI 1 are fed back together, and the PMI 2 and the CQI are fed back together. The BI is respective indication information corresponding to the M CSI-RS resources.

Specifically, the feedback mode is a second feedback mode; the feedback type includes an eleventh feedback type, a twelfth feedback type, and a thirteenth feedback type; the eleventh feedback type is corresponding to an eleventh feedback period, the twelfth feedback type is corresponding to a twelfth feedback period, and the thirteenth feedback type is corresponding to a thirteenth feedback period; a feedback parameter of the eleventh feedback type includes RIs obtained by means of measurement according to the M CSI-RS resources, a feedback parameter of the twelfth feedback type includes the indication information and the PMIs 1 of the M CSI-RS resources, and a feedback parameter of the thirteenth feedback type includes the PMIs 2 and CQIs that are obtained by means of measurement according to the M CSI-RS resources, where a quantity of the PMIs 1 is 1, and if the PMIs 2 of the CSI-RS resources are different, the PMIs 2 are M different PMI 2. The eleventh period>the twelfth period>the thirteenth period Referring to FIG. 9, in the second manner of the submode 3 of the feedback mode 1-1, the RI is fed back in a subframe 0, the BI and the PMI 1 are fed back in a subframe 2, and the PMIs 2 and the CQIs that are obtained by means of measurement are fed back in a subframe 4. The feedback process is a periodic feedback process. Alternatively, aperiodic feedback may be performed. Alternatively, the PMIs 2 obtained by means of measurement may be fed back in different subframes.

7. A Third Manner (Submode 3-3) of the Submode 3 of the Feedback Mode 1-1.

In this feedback mode, M≥2, CSI of each of the M CSI-RS resources includes: a rank indication RI, a precoding matrix indicator PMI 1 corresponding to a wideband codeword W1, a precoding matrix indicator PMI 2 corresponding to a wideband codeword W2, and a wideband channel quality indicator CQI, PMIs 1 of the CSI-RS resources are the same or different, and PMIs 2 of the CSI-RS resources are different. In this case, the UE first feeds back the RI, and then feeds back BI, the PMI 1, the PMI 2, and the CQI. The RI is independently fed back, the BI and the PMI 1 are fed back together, the different PMIs 2 are fed back in different subframes, and the CQI is independently fed back. The indication information is respective indication information corresponding to the M CSI-RS resources.

Specifically, the feedback mode is a second feedback mode; the feedback type includes a fourteenth feedback type, a fifteenth feedback type, a sixteenth feedback type, a seventeenth feedback type, and an eighteenth feedback type; the fourteenth feedback type is corresponding to a fourteenth feedback period, the fifteenth feedback type is corresponding to a fifteenth feedback period, the sixteenth feedback type is corresponding to a sixteenth feedback period, the seventeenth feedback type is corresponding to a seventeenth feedback period, and the eighteenth feedback type is corresponding to an eighteenth feedback period; a feedback parameter of the fourteenth feedback type includes RIs obtained by means of measurement according to the M CSI-RS resources, a feedback parameter of the fifteenth feedback type includes the indication information of the M CSI-RS resources and the PMIs 1 obtained by means of measurement according to the M CSI-RS resources, a feedback parameter of the sixteenth feedback type includes PMIs 2 obtained by means of measurement according to some of the M CSI-RS resources, a feedback parameter of the seventeenth feedback type includes PMIs 2 obtained by means of measurement according to remaining resources of the M CSI-RS resources, and a feedback parameter of the eighteenth feedback type includes CQIs obtained by means of measurement according to the M CSI-RS resources; where if the PMIs 1 of the CSI-RS resources are the same, a quantity of the PMIs 1 is 1, or if the PMIs 1 of the CSI-RS resources are different, a quantity of the PMIs 1 is M.

Referring to FIG. 9, it is assumed that BI of CSI-RS resources determined by the UE is BI 0 and BI 1. In the third manner of the submode 3 of the feedback mode 1-1, the RI is fed back in a subframe 0, the BI and the W1 are fed back in a subframe 2, W2 corresponding to the BI 0 is fed back in a subframe 4, W2 corresponding to the BI 1 is fed back in a subframe 7, and the CQI is fed back in a subframe 9. The feedback process is a periodic feedback process. Alternatively, aperiodic feedback may be performed.

8. A Fourth Manner (Submode 3-4) of the Submode 3 of the Feedback Mode 1-1.

In this feedback mode, M≥2, CSI of each of the M CSI-RS resources includes: a rank indication RI, a precoding matrix indicator PMI 1 corresponding to a wideband codeword W1, a precoding matrix indicator PMI 2 corresponding to a wideband codeword W2, and a wideband channel quality indicator CQI, PMIs 1 of the CSI-RS resources are different, and PMIs 2 of the CSI-RS resources are different. In this case, the UE first feeds back the RI, and then feeds back the BI, the PMI 1, the PMI 2, and the CQI. The RI is independently fed back, the different PMIs 1 are fed back in one subframe, the different PMIs 2 are fed back in one subframe, and the CQI is independently fed back.

Specifically, referring to FIG. 9, it is assumed that BI of CSI-RS resources determined by the UE is BI 0 and BI 1. In the fourth manner of the submode 3 of the feedback mode 1-1, the RI is fed back in a subframe 0, the BI and the different W1 are fed back in a subframe 2, the different W2 are fed back in a subframe 4, and the CQI is fed back in a subframe 7. The feedback process is a periodic feedback process. Alternatively, aperiodic feedback may be performed.

9. A Feedback Mode 2-1.

In this feedback mode, the channel state information includes a precoding type indicator PTI, a rank indication RI, a PMI 1 corresponding to a wideband codeword W1, a PMI 2 corresponding to a wideband codeword W2, a wideband channel quality indicator CQI, a PMI 3 corresponding to a subband codeword W2, and a subband channel quality indicator CQI. In this case, the BI and the PTI are fed back in one subframe. If the PTI=0, the PMI 1, the RI, the PMI 2, and the wideband CQI are reported subsequently. Then the RI, the PTI=1, the PMI 2, the wideband CQI, the PMI 3, and the subband CQI are reported. When the PTI is equal to 0, the BI needs to be measured and reported again.

Specifically, referring to FIG. 10, FIG. 10 is a schematic diagram of the feedback mode 2-1 in the channel state information feedback method according to the present disclosure. A wideband may be denoted as wb, and a subband may be denoted as sb.

10. PTI Feedback.

The CSI further includes a precoding type index PTI, a precoding matrix indicator PMI 2 corresponding to a subband codeword W2, and a subband channel quality indicator CQI. When the PTI=0, the feedback parameter included in the feedback type is a precoding matrix indicator PMI 2 corresponding to a wideband codeword W2, and a wideband channel quality indicator CQI; or when the PTI=1, the feedback parameter included in the feedback type is the precoding matrix indicator PMI 2 corresponding to the subband codeword W2, and the subband channel quality indicator CQI. When PMI=0, the indication information is updated; or when PMI=1, the indication information is not updated. A sequence of feeding back the PTI and the indication information may be one of the following sequences: the PTI and the indication information are fed back at the same time; the PTI is fed back first, and then the indication information is fed back; or the indication information is fed back first, and then the PTI is fed back.

Specifically, refer to the first to the seventh feedback manners in FIG. 11A to FIG. 11E. FIG. 11A to FIG. 11E are a schematic diagram of the channel state information feedback method according to the present disclosure. The sixth and the seventh feedback manners are applicable to non-precoded channel state information feedback.

Referring to FIG. 11A to FIG. 11E, FIG. 11A to FIG. 11E include feedback modes a to e. A feedback mode f is not shown in FIG. 11A to FIG. 11E.

The feedback mode a: A first feedback type includes the PTI, a second feedback type includes the indication information BI of the selected M CSI-RS resources, a third feedback type includes wideband W1 and RIs that are obtained by means of measurement according to the selected M CSI-RS resources, a fourth feedback type includes wideband W2 and wideband CQIs, and a fifth feedback type includes subband W2 and subband CQIs.

Only when the PTI=0, the BI is reported. When the PTI=1, the BI is not reported.

When the PTI=0, the second feedback type, the third feedback type, and the fourth feedback type are reported. When the PTI=1, the fourth feedback type and the fifth feedback type are reported.

The feedback mode b: A first feedback type includes the BI, a second feedback type includes the PTI, a third feedback type includes wideband W1 and RIs, a fourth feedback type includes wideband W2 and wideband CQIs, and a fifth feedback type includes subband W2 and subband CQIs.

A period corresponding to the first feedback type is greater than a period of another feedback type.

The feedback mode c: If the quantity M of selected CSI-RS resources in the BI is greater than 1, a first feedback type includes the PTI; a second feedback type includes the BI; a third feedback type includes RIs and first PMIs corresponding to wideband W1; a fourth feedback type includes second PMIs corresponding to wideband W2 corresponding to the M CSI-RS resources, and there are M wideband second PMIs in total; a fifth feedback type includes subband second PMIs corresponding to subband W2 corresponding to the M CSI-RS resources, and there are M subband second PMIs in total; the M wideband second PMIs may be fed back at the same moment, or at different moments; and the M subband second PMIs may be fed back at the same moment, or at different moments.

A period corresponding to the first feedback type is greater than a period of another feedback type.

When the PTI=0, the second feedback type, the third feedback type, and the fourth feedback type are reported. When the PTI=1, the fourth feedback type and the fifth feedback type are reported.

The feedback mode d: If the quantity M of selected CSI-RS resources in the BI is greater than 1, a first feedback type includes the PTI; a second feedback type includes the indication information of the selected M CSI-RS resources; a third feedback type includes RIs and first PMIs corresponding to wideband W1; a fourth feedback type includes second PMIs corresponding to wideband W2 corresponding to the M CSI-RS resources, and there are M wideband second PMIs in total; a fifth feedback type includes subband second PMIs corresponding to subband W2 corresponding to the M CSI-RS resources, and there are M subband second PMIs in total; the M wideband second PMIs may be fed back at the same moment, or at different moments; and the M subband second PMIs may be fed back at the same moment, or at different moments. A sixth feedback type includes a CQI corresponding to a CSI-RS resource corresponding to each BI.

When the PTI is in a first state, wideband CQI information corresponding to the N CSI-RS resources are fed back at different moments. When the PTI is in a second state, the second feedback type, the third feedback type, and the fourth feedback type are fed back. When the PTI is in a third state, the fourth feedback type and the fifth feedback type are fed back.

For a non-precoded CSI-RS, it is determined, according to different reported PTI states, whether a first precoding matrix index in a horizontal dimension and a first precoding matrix index in a vertical dimension that are reported subsequently are of a wideband or a subband.

Feedback Mode e:

For a non-precoded CSI-RS, it is determined, according to different reported PTI states, whether a first precoding matrix index in a horizontal dimension and a first precoding matrix index in a vertical dimension that are reported subsequently are of a wideband or a subband. For example, if the PTI=00, a first precoding matrix index of a wideband in the horizontal dimension and a first precoding matrix index of a wideband in the vertical dimension are reported; if the PTI=01, a first precoding matrix index of a wideband in the horizontal dimension and a first precoding matrix index of a subband in the vertical dimension are reported; if the PTI=10, a first precoding matrix index of a wideband in the horizontal dimension and a first precoding matrix index of a subband in the vertical dimension are reported; or if the PTI=11, a first precoding matrix index of a subband in the horizontal dimension and a first precoding matrix index of a subband in the vertical dimension are reported.

Feedback Mode f:

For a non-precoded CSI-RS, it is determined, according to different reported PTI states, whether a second precoding matrix index in a horizontal dimension and a second precoding matrix index in a vertical dimension that are reported subsequently are of a wideband or a subband. For a non-precoded CSI-RS, it is determined, according to different reported PTI states, whether a first precoding matrix index in a horizontal dimension and a first precoding matrix index in a vertical dimension that are reported subsequently are of a wideband or a subband. For example, if the PTI=00, a second precoding matrix index of a wideband in the horizontal dimension and a second precoding matrix index of a wideband in the vertical dimension are reported; if the PTI=01, a second precoding matrix index of a wideband in the horizontal dimension and a second precoding matrix index of a subband in the vertical dimension are reported; if the PTI=10, a second precoding matrix index of a wideband in the horizontal dimension and a second precoding matrix index of a subband in the vertical dimension are reported; or if the PTI=11, a second precoding matrix index of a subband in the horizontal dimension and a second precoding matrix index of a subband in the vertical dimension are reported.

The following describes in detail feedback of non-precoded (non-precoded) channel state information.

Figure 12:
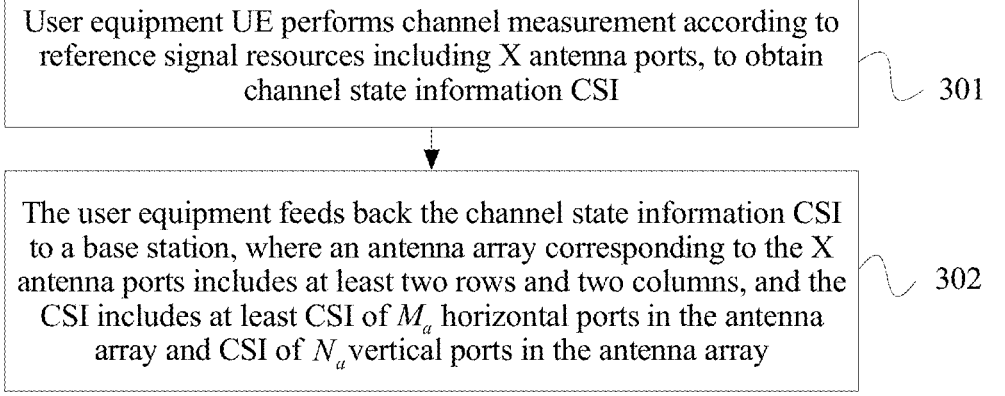
FIG. 12 is a flowchart of Embodiment 3 of a channel state information feedback method according to the present disclosure.

FIG. 12 is a flowchart of Embodiment 3 of the channel state information feedback method according to the present disclosure. This embodiment includes the following steps:

301. User equipment UE performs channel measurement according to reference signal resources including X antenna ports, to obtain channel state information CSI.

302. The user equipment feeds back the channel state information CSI to a base station, where an antenna array corresponding to the X antenna ports includes at least two rows and two columns, and the CSI includes at least CSI of $M_a$ horizontal ports in the antenna array and CSI of $N_a$ vertical ports in the antenna array.

This embodiment of the present disclosure implements feedback of non-precoded channel state information.

Optionally, in an embodiment of the present disclosure, a precoding matrix for the X antenna ports is $W=W1\times W2$; the first codeword W1 is $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix},$$

where k=0, ..., $M_aQ_H-1$, l=0, ..., $N_aQ_V-1$, $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^p-1}]$, l=0, ... L, l'=f(l), where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^p-1}]$, k=0, ... K, k'=f(k), where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $$X^l = \begin{bmatrix} 1 & e^{j2\pi \frac{l}{NQ}} & \cdots & e^{j2\pi \frac{(N-1)l}{NQ}} \end{bmatrix}^T, l=0, \ldots, NQ-1.$$

Optionally, in an embodiment of the present disclosure, before the feeding back, by the UE, the channel state information to a base station, the method further includes:

determining, by the UE, a rank of the antenna array corresponding to $M_a \times N_a \times 2$ ports;

determining, by the UE, a group number k of a fixed beam group $\tilde{X}_H^k$ in the horizontal dimension of the antenna array;

determining, by the UE, a group number l of a fixed beam group $\tilde{X}_V^l$ in the vertical dimension of the antenna array; and generating, by the UE, a precoding matrix according to k, l, and the second codeword W2, and determining a channel quality indicator CQI according to the precoding matrix; where the channel state information includes the rank, k, l, the CQI, and a precoding matrix indicator PMI 2 corresponding to the second codeword W2; and the feeding back, by the user equipment, the CSI to a base station includes:

feeding back, by the UE according to a feedback type, the rank, k, l, and the CQI to the base station, where the feedback type refers to a feedback parameter fed back by the UE at a time at a feedback moment, and the feedback parameter includes at least one of the rank, k, l, the PMI 2, or the CQI.

Optionally, in an embodiment of the present disclosure, the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes k, a feedback parameter of the third feedback type includes l, a feedback parameter of the fourth feedback type includes the PMI 2 corresponding to the second codeword W2, and a feedback parameter of the fifth feedback type includes the CQI.

Optionally, in an embodiment of the present disclosure, the first feedback period>the second feedback period>the third feedback period>the fourth feedback period>the fifth feedback period.

Optionally, in an embodiment of the present disclosure, W=W1×W2.

The first codeword W1 is $$W_1(k,l) = \begin{bmatrix} \tilde{X}_H^k * W_2^H \otimes \tilde{X}_V^l * W_2^V & 0 \\ 0 & \tilde{X}_H^k * W_2^H \otimes \tilde{X}_V^l * W_2^V \end{bmatrix},$$

where $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array.

$\tilde{X}_V^l = [X_V^{l'} X_V^{l'+1} \ldots X_V^{l'+N_V^p-1}]$, l=0, ... L, l'=f(l), where $\tilde{X}_H^k$ is a codeword set of a fixed beam group corresponding to the horizontal dimension of the antenna array.

$\tilde{X}_H^k = [X_H^{k'} X_H^{k'+1} \ldots X_H^{k'+N_H^p-1}]$, k=0, ... K, k'=f(k), where $\tilde{X}_V^l$ is a codeword set of a fixed beam group corresponding to the vertical dimension of the antenna array, $W_2^H$ is used to perform column selection for $\tilde{X}_H^k$ and adjust phases of the two groups of $\tilde{X}_H^k$, and $W_2^V$ is used to perform column selection for $\tilde{X}_V^l$ and adjust phases of the two groups of antennas.

The UE determines a rank of the antenna array corresponding to $M_a \times N_a \times 2$ ports.

The UE determines a group number k of the fixed beam group $\tilde{X}_H^k$ in the horizontal dimension of the antenna array.

The UE determines a group number l of the fixed beam group $\tilde{X}_V^l$ in the vertical dimension of the antenna array.

The UE determines a horizontal group number of the second codeword W2.

The UE determines a vertical group number of the second codeword 2.

The UE determines a third codebook W3 used for phase adjustment.

The channel state information includes the rank, k, l, the horizontal group number of the second codeword W2, the vertical group number of the second codeword W2, and the third codebook W3.

The feeding back, by the user equipment, the CSI to a base station includes:

feeding back, by the UE, the rank, k, l, the horizontal group number of the second codeword W2, the vertical group number of the second codeword W2, and the third codebook W3 to the base station according to the double codebook structure and a feedback type, where the feedback type refers to a feedback parameter fed back by the UE at a time at a feedback moment, and the feedback parameter includes the rank, k, l, the horizontal group number of the second codeword W2, the vertical group number of the second codeword W2, and the third codebook W3.

The feedback type includes a sixth feedback type, a seventh feedback type, an eighth feedback type, a ninth feedback type, a tenth feedback type, and an eleventh feedback type; the sixth feedback type is corresponding to a sixth feedback period, the seventh feedback type is corresponding to a seventh feedback period, the eighth feedback type is corresponding to an eighth feedback period, the ninth feedback type is corresponding to a ninth feedback period, the tenth feedback type is corresponding to a tenth feedback period, and the eleventh feedback type is corresponding to an eleventh feedback period; a feedback parameter of the sixth feedback type includes the rank, a feedback parameter of the seventh feedback type includes k, a feedback parameter of the eighth feedback type includes l, a feedback parameter of the ninth feedback type includes the horizontal group number of the second codeword W2, a feedback parameter of the tenth feedback type includes the vertical group number of the second codeword W2, and a feedback parameter of the eleventh feedback type includes the third codebook W3.

The sixth feedback period>the seventh feedback period>the eighth feedback period>the ninth feedback period>the tenth feedback period>the eleventh feedback period.

Figure 13:
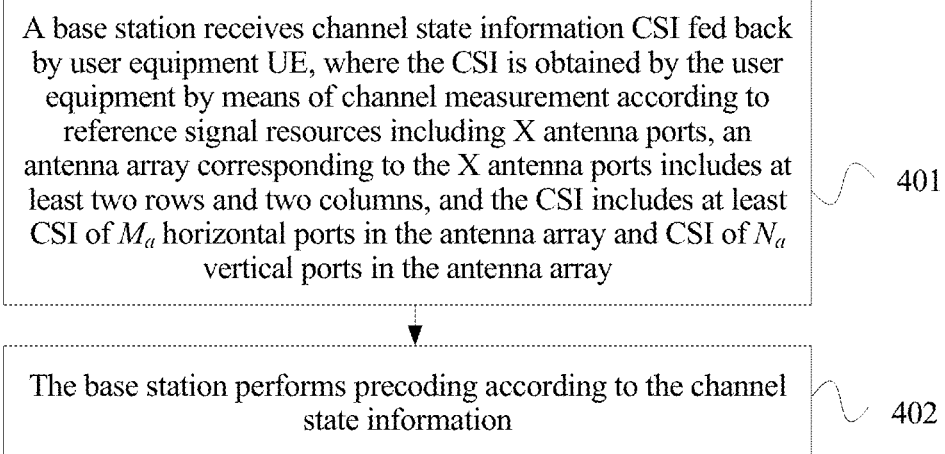
FIG. 13 is a flowchart of Embodiment 4 of a channel state information feedback method according to the present disclosure.

FIG. 13 is a flowchart of Embodiment 4 of the channel state information feedback method according to the present disclosure. This embodiment includes the following steps:

401. A base station receives channel state information CSI fed back by user equipment UE, where the CSI is obtained by the user equipment by means of channel measurement according to reference signal resources including X antenna ports, an antenna array corresponding to the X antenna ports includes at least two rows and two columns, and the CSI includes at least CSI of $M_a$ horizontal ports in the antenna array and CSI of $N_a$ vertical ports in the antenna array.

402. The base station performs precoding according to the channel state information.

Optionally, in an embodiment of the present disclosure, a precoding matrix for the X antenna ports is W=W1×W2; the first codeword W1 is $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix},$$

where k=0, ..., $M_a Q_H$−1, l=0, ..., $N_a Q_V$−1, $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^b-1}]$, l=0, ... L, l'=f(l), where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^b-1}]$, k=0, ... K, k'=f(k), where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $$X^l = \begin{bmatrix} 1 & e^{j2\pi\frac{l}{NQ}} & \ldots & e^{j2\pi\frac{(N-1)l}{NQ}} \end{bmatrix}^T, l = 0, \ldots, NQ-1.$$

Optionally, in an embodiment of the present disclosure, the channel state information includes a rank of the antenna array corresponding to $M_a \times N_a \times 2$ ports that is determined by the UE, a group number k of a fixed beam group $\tilde{X}_H^k$ in the horizontal dimension of the antenna array that is determined by the UE, a group number l of a fixed beam group $\tilde{X}_V^l$ in the vertical dimension of the antenna array that is determined by the UE, and a channel quality indicator CQI determined by the UE.

The receiving, by a base station, channel state information CSI fed back by user equipment UE includes:

receiving, by the base station, the rank, k, l, the CQI, and a precoding matrix indicator PMI 2 corresponding to the second codeword W2 that are fed back by the UE according to a feedback type, where the feedback type refers to a feedback parameter fed back by the UE at a time at a feedback moment, and the feedback parameter includes at least one of the rank, k, l, the PMI 2, or the CQI.

Optionally, in an embodiment of the present disclosure, the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes k, a feedback parameter of the third feedback type includes l, a feedback parameter of the fourth feedback type includes the PMI 2 corresponding to the second codeword W2, and a feedback parameter of the fifth feedback type includes the CQI.

Optionally, in an embodiment of the present disclosure, the first feedback period>the second feedback period>the fourth feedback period>the fifth feedback period, or the first feedback period>the third feedback period>the fourth feedback period>the fifth feedback period.

Optionally, in an embodiment of the present disclosure, W=W1×W3; the first codeword W1 is $$W_1(k,l) = \begin{bmatrix} \tilde{X}_H^k * W_2^H \otimes \tilde{X}_V^l * W_2^V & 0 \\ 0 & \tilde{X}_H^k * W_2^H \otimes \tilde{X}_V^l * W_2^V \end{bmatrix},$$

where $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^b-1}]$, l=0, ... L, l'=f(l), where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^b-1}]$, k=0, ... K, k'=f(k), where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $W_2^H$ is a second precoding matrix in the horizontal dimension, and is used to perform column selection for $\tilde{X}_H^k$, $W_2^V$ is a second precoding matrix in the vertical dimension, and is used to perform column selection for $\tilde{X}_V^l$, and W3 is used to adjust phases of the two groups of antennas of W1.

The feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes the first precoding matrix corresponding to the horizontal dimension of the antenna array, a feedback parameter of the third feedback type includes the first precoding matrix corresponding to the vertical dimension, a feedback parameter of the fourth feedback type includes the second precoding matrix corresponding to the horizontal dimension, a feedback parameter of the fifth feedback type includes the second precoding matrix corresponding to the vertical dimension, and a feedback parameter of a sixth feedback type includes a CQI; the first feedback period>the second feedback period>the third feedback period>the sixth feedback period, or the first feedback period>the third feedback period>the fourth feedback period>the sixth feedback period.

Figure 14:
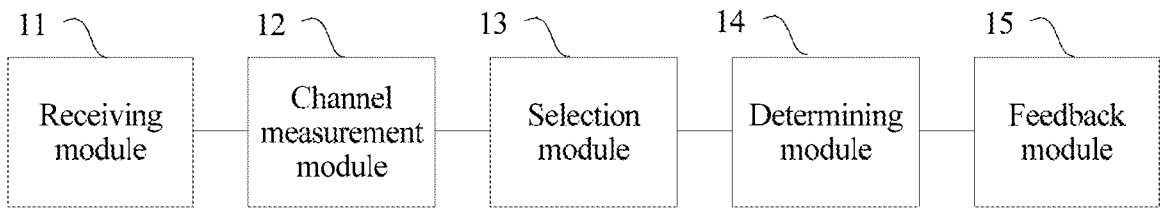
FIG. 14 is a schematic structural diagram of Embodiment 1 of user equipment according to the present disclosure.

FIG. 14 is a schematic structural diagram of Embodiment 1 of user equipment according to the present disclosure. As shown in FIG. 14, the user equipment provided in this embodiment includes:

a receiving module 11, configured to receive N configured channel state information-reference signal CSI-RS resources, where the CSI-RS resources include at least one port, N≥2, and N is an integer;

a channel measurement module 12, configured to perform channel measurement on the N CSI-RS resources, to obtain channel state information CSI of the N CSI-RS resources;

a selection module 13, configured to select M CSI-RS resources from the N CSI-RS resources, where the M CSI-RS resources belong to different CSI processes, or the M CSI-RS resources belong to different configurations of one CSI process;

a determining module 14, configured to determine CSI of the M CSI-RS resources from the channel state information CSI of the N CSI-RS resources according to the M CSI-RS resources; and a feedback module 15, configured to feed back the CSI of the M CSI-RS resources and indication information of the M CSI-RS resources to a base station.

The user equipment provided in this embodiment of the present disclosure determines the N CSI-RS resources according to a quantity N, configured by the base station, of CSI-RS resources that need to be fed back; performs channel estimation on the port included in the N CSI-RS resources, to obtain the channel state information in a horizontal dimension; then selects the M CSI-RS resources from the N CSI-RS resources; and feeds back the channel state information of the M CSI-RS resources in the horizontal dimension and the indication information of the M CSI-RS resources to the base station, so that the base station determines channel state information in a vertical dimension according to the indication information, so as to finally obtain the channel state information in the two dimensions, thereby resolving a problem that channel state information in only a horizontal dimension is fed back during conventional channel estimation.

Optionally, in an embodiment of the present disclosure, the indication information of the M CSI-RS resources includes first indication information and/or second indication information, the first indication information is a value of M, and the second indication information is indexes of the M CSI-RS resources.

Optionally, in an embodiment of the present disclosure, CSI of each of the M CSI-RS resources includes: a rank indication RI, a precoding matrix indicator PMI 1 corresponding to a codeword W1, a precoding matrix indicator PMI 2 corresponding to a codeword W2, and a channel quality indicator CQI, the W1 and the W2 are respectively corresponding to W1 and W2 in a double codebook structure W, and W=W1*W2.

The feedback module 15 is specifically configured to feed back the CSI of the M CSI-RS resources and the indication information of the M CSI-RS resources to the base station according to a feedback mode and a feedback type, where the feedback type refers to a feedback parameter fed back by the UE at a time at a feedback moment, and the feedback parameter includes at least one of the RI, the PMI 1, the PMI 2, the CQI, or the indication information.

Optionally, in an embodiment of the present disclosure, the feedback mode is a first feedback mode; the feedback type includes a first feedback type, a second feedback type, and a third feedback type; the first feedback type is corresponding to a first feedback period, the second feedback type is corresponding to a second feedback period, and the third feedback type is corresponding to a third feedback period; a feedback parameter of the first feedback type includes the indication information of the M CSI-RS resources, a feedback parameter of the second feedback type includes RIs and PMIs 1 that are obtained by means of measurement according to the M CSI-RS resources, and a feedback parameter of the third feedback type includes PMIs 2 and CQIs that are obtained by means of measurement according to the M CSI-RS resources.

Optionally, in an embodiment of the present disclosure, the first feedback period>the second feedback period>the third feedback period.

Optionally, in an embodiment of the present disclosure, the feedback mode is a first feedback mode; the feedback type includes a fourth feedback type and a fifth feedback type; the fourth feedback type is corresponding to a fourth feedback period, and the fifth feedback type is corresponding to a fifth feedback period; a feedback parameter of the fourth feedback type includes the indication information of the M CSI-RS resources, and RIs and PMIs 1 that are obtained by means of measurement according to the M CSI-RS resources, and a feedback parameter of the fifth feedback type includes PMIs 2 and CQIs that are obtained by means of measurement according to the M CSI-RS resources.

Optionally, in an embodiment of the present disclosure, the fourth feedback period>the fifth feedback period.

Optionally, in an embodiment of the present disclosure, the feedback mode is a first feedback mode; the feedback type includes a sixth feedback type, a seventh feedback type, and an eighth feedback type; the sixth feedback type is corresponding to a sixth feedback period, the seventh feedback type is corresponding to a seventh feedback period, and the eighth feedback type is corresponding to an eighth feedback period; a feedback parameter of the sixth feedback type includes the indication information of the M CSI-RS resources, a feedback parameter of the seventh feedback type includes RIs obtained by means of measurement according to the M CSI-RS resources, and a feedback parameter of the eighth feedback type includes PMIs 1, PMIs 2, and CQIs that are obtained by means of measurement according to the M CSI-RS resources.

Optionally, in an embodiment of the present disclosure, the sixth feedback period>the seventh feedback period>the eighth feedback period.

Optionally, in an embodiment of the present disclosure, the feedback mode is a first feedback mode; the feedback type includes a ninth feedback type and a tenth feedback type; the ninth feedback type is corresponding to a ninth feedback period, and the tenth feedback type is corresponding to a tenth feedback period; a feedback parameter of the ninth feedback type includes the indication information and RIs of the M CSI-RS resources, and a feedback parameter of the tenth feedback type includes PMIs 1, PMIs 2, and CQIs that are obtained by means of measurement according to the M CSI-RS resources.

Optionally, in an embodiment of the present disclosure, the ninth feedback period>the tenth feedback period.

Optionally, in an embodiment of the present disclosure, the RIs of the M CSI-RS resources are obtained by means of measurement according to the M CSI-RS resources.

Optionally, in an embodiment of the present disclosure, M is 1 in the first feedback mode.

Optionally, in an embodiment of the present disclosure, M≥2, it is assumed that PMIs 1 obtained by means of measurement according to the M CSI-RS resources are the same, and PMIs 2 obtained by means of measurement according to the CSI-RS resources are the same or different, a precoding matrix corresponding to the PMI 1 and the PMI 2 is obtained by means of measurement according to each CSI-RS resource, and an antenna quantity corresponding to the precoding matrix is a quantity of antenna ports included in each CSI-RS resource.

The feedback mode is a second feedback mode; the feedback type includes an eleventh feedback type, a twelfth feedback type, and a thirteenth feedback type; the eleventh feedback type is corresponding to an eleventh feedback period, the twelfth feedback type is corresponding to a twelfth feedback period, and the thirteenth feedback type is corresponding to a thirteenth feedback period; a feedback parameter of the eleventh feedback type includes RIs obtained by means of measurement according to the M CSI-RS resources, a feedback parameter of the twelfth feedback type includes the indication information and the PMIs 1 of the M CSI-RS resources, and a feedback parameter of the thirteenth feedback type includes the PMIs 2 and CQIs that are obtained by means of measurement according to the M CSI-RS resources, where a quantity of the PMIs 1 is 1, and if the PMIs 2 obtained by means of measurement according to the CSI-RS resources are the same, a quantity of the PMIs 2 is 1, or if the PMIs 2 obtained by means of measurement according to the CSI-RS resources are different, the PMIs 2 are M PMIs 2.

Optionally, in an embodiment of the present disclosure, the eleventh feedback period>the twelfth feedback period>the thirteenth feedback period.

Optionally, in an embodiment of the present disclosure, M≥2, PMIs 1 of the CSI-RS resources are the same or different, and PMIs 2 of the CSI-RS resources are different.

The feedback mode is a second feedback mode; the feedback type includes a fourteenth feedback type, a fifteenth feedback type, a sixteenth feedback type, a seventeenth feedback type, and an eighteenth feedback type; the fourteenth feedback type is corresponding to a fourteenth feedback period, the fifteenth feedback type is corresponding to a fifteenth feedback period, the sixteenth feedback type is corresponding to a sixteenth feedback period, the seventeenth feedback type is corresponding to a seventeenth feedback period, and the eighteenth feedback type is corresponding to an eighteenth feedback period; a feedback parameter of the fourteenth feedback type includes RIs obtained by means of measurement according to the M CSI-RS resources, a feedback parameter of the fifteenth feedback type includes the indication information of the M CSI-RS resources and the PMIs 1 obtained by means of measurement according to the M CSI-RS resources, a feedback parameter of the sixteenth feedback type includes PMIs 2 obtained by means of measurement according to some of the M CSI-RS resources, a feedback parameter of the seventeenth feedback type includes PMIs 2 obtained by means of measurement according to remaining resources of the M CSI-RS resources, and a feedback parameter of the eighteenth feedback type includes CQIs obtained by means of measurement according to the M CSI-RS resources; where if the PMIs 1 obtained by means of measurement according to the CSI-RS resources are the same, a quantity of the PMIs 1 is 1, or if the PMIs 1 obtained by means of measurement according to the CSI-RS resources are different, the PMIs 1 are M PMIs 1.

Optionally, in an embodiment of the present disclosure, the fourteenth feedback period>the fifteenth feedback period>the sixteenth feedback period>the seventeenth feedback period>the eighteenth feedback period.

Optionally, in an embodiment of the present disclosure, M is notified by the base station to the UE, or is determined by the UE.

Optionally, in an embodiment of the present disclosure, the determining module 14 is further configured to determine the feedback mode according to M.

Optionally, in an embodiment of the present disclosure, the feedback module 15 is configured to feed back the first indication information and the second indication information in different feedback types.

Optionally, in an embodiment of the present disclosure, the feedback module 15 is specifically configured to aperiodically feed back the indication information of the M CSI-RS resources to the base station.

Optionally, in an embodiment of the present disclosure, the CSI further includes a precoding type index PTI, a precoding matrix indicator PMI 2 corresponding to a subband codeword W2, and a subband channel quality indicator CQI; and when the PTI=0, the feedback parameter included in the feedback type is a precoding matrix indicator PMI 2 corresponding to a wideband codeword W2, and a wideband channel quality indicator CQI; or when the PTI=1, the feedback parameter included in the feedback type is the precoding matrix indicator PMI 2 corresponding to the subband codeword W2, and the subband channel quality indicator CQI.

When PMI=0, the indication information is updated; or when PMI=1, the indication information is not updated.

A sequence of feeding back the PTI and the indication information may be one of the following sequences:

the PTI and the indication information are fed back at the same time; the PTI is fed back first, and then the indication information is fed back; or the indication information is fed back first, and then the PTI is fed back.

Figure 15:
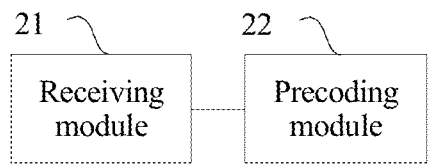
FIG. 15 is a schematic structural diagram of Embodiment 1 of a base station according to the present disclosure.

FIG. 15 is a schematic structural diagram of Embodiment 1 of a base station according to the present disclosure. As shown in FIG. 15, the base station provided in this embodiment includes:

a receiving module 21, configured to receive CSI of M CSI-RS resources and indication information of the M CSI-RS resources that are fed back by user equipment UE, where the M CSI-RS resources are selected by the UE from N CSI-RS resources, the N CSI-RS resources are configured by the base station and received by the UE, the CSI-RS resources include at least one port, N≥2, and N is an integer; and a precoding module 22, configured to perform precoding according to the M CSI-RS resources.

The base station provided in this embodiment of the present disclosure receives the channel state information of the M CSI-RS resources in a horizontal dimension and the indication information of the M CSI-RS resources that are fed back by the user equipment, and determines channel state information in a vertical dimension according to the indication information, so as to finally obtain the channel state information in the two dimensions, thereby resolving a problem that channel state information in only a horizontal dimension is fed back during conventional channel estimation.

Optionally, in an embodiment of the present disclosure, the indication information of the M CSI-RS resources includes first indication information and/or second indication information, the first indication information is a value of M, and the second indication information is indexes of the M CSI-RS resources.

Optionally, in an embodiment of the present disclosure, CSI of each of the M CSI-RS resources includes: a rank indication RI, a precoding matrix indicator PMI 1 corresponding to a codeword W1, a precoding matrix indicator PMI 2 corresponding to a codeword W2, and a channel quality indicator CQI, the W1 and the W2 are respectively corresponding to W1 and W2 in a double codebook structure W, and W=W1*W2.

The receiving module 21 is specifically configured to receive the CSI of the M CSI-RS resources and the indication information of the M CSI-RS resources that are fed back by the UE according to a feedback mode and a feedback type, where the feedback type refers to a feedback parameter fed back by the UE at a time at a feedback moment, and the feedback parameter includes at least one of the RI, the PMI 1, the PMI 2, the CQI, or the indication information.

Optionally, in an embodiment of the present disclosure, the feedback mode is a first feedback mode; the feedback type includes a first feedback type, a second feedback type, and a third feedback type; the first feedback type is corresponding to a first feedback period, the second feedback type is corresponding to a second feedback period, and the third feedback type is corresponding to a third feedback period; a feedback parameter of the first feedback type includes the indication information of the M CSI-RS resources, a feedback parameter of the second feedback type includes RIs and PMIs 1 that are obtained by means of measurement according to the M CSI-RS resources, and a feedback parameter of the third feedback type includes PMIs 2 and CQIs that are obtained by means of measurement according to the M CSI-RS resources.

Optionally, in an embodiment of the present disclosure, the first feedback period>the second feedback period>the third feedback period.

Optionally, in an embodiment of the present disclosure, the feedback mode is a first feedback mode; the feedback type includes a fourth feedback type and a fifth feedback type; the fourth feedback type is corresponding to a fourth feedback period, and the fifth feedback type is corresponding to a fifth feedback period; a feedback parameter of the fourth feedback type includes the indication information of the M CSI-RS resources, and RIs and PMIs 1 that are obtained by means of measurement according to the M CSI-RS resources, and a feedback parameter of the fifth feedback type includes PMIs 2 and CQIs that are obtained by means of measurement according to the M CSI-RS resources.

Optionally, in an embodiment of the present disclosure, the fourth feedback period>the fifth feedback period.

Optionally, in an embodiment of the present disclosure, the feedback mode is a first feedback mode; the feedback type includes a sixth feedback type, a seventh feedback type, and an eighth feedback type; the sixth feedback type is corresponding to a sixth feedback period, the seventh feedback type is corresponding to a seventh feedback period, and the eighth feedback type is corresponding to an eighth feedback period; a feedback parameter of the sixth feedback type includes the indication information of the M CSI-RS resources, a feedback parameter of the seventh feedback type includes RIs obtained by means of measurement according to the M CSI-RS resources, and a feedback parameter of the eighth feedback type includes PMIs 1, PMIs 2, and CQIs that are obtained by means of measurement according to the M CSI-RS resources.

Optionally, in an embodiment of the present disclosure, the sixth feedback period>the seventh feedback period>the eighth feedback period.

Optionally, in an embodiment of the present disclosure, the feedback mode is a first feedback mode; the feedback type includes a ninth feedback type and a tenth feedback type; the ninth feedback type is corresponding to a ninth feedback period, and the tenth feedback type is corresponding to a tenth feedback period; a feedback parameter of the ninth feedback type includes the indication information and RIs of the M CSI-RS resources, and a feedback parameter of the tenth feedback type includes PMIs 1, PMIs 2, and CQIs that are obtained by means of measurement according to the M CSI-RS resources.

Optionally, in an embodiment of the present disclosure, the ninth feedback period>the tenth feedback period.

Optionally, in an embodiment of the present disclosure, the RIs of the M CSI-RS resources are obtained by means of measurement according to the M CSI-RS resources.

Optionally, in an embodiment of the present disclosure, M is 1 in the first feedback mode.

Optionally, in an embodiment of the present disclosure, M≥2, it is assumed that PMIs 1 obtained by means of measurement according to the M CSI-RS resources are the same, and PMIs 2 obtained by means of measurement according to the CSI-RS resources are the same or different, a precoding matrix corresponding to the PMI 1 and the PMI 2 is obtained by means of measurement according to each CSI-RS resource, and an antenna quantity corresponding to the precoding matrix is a quantity of antenna ports included in each CSI-RS resource.

The feedback mode is a second feedback mode; the feedback type includes an eleventh feedback type, a twelfth feedback type, and a thirteenth feedback type; the eleventh feedback type is corresponding to an eleventh feedback period, the twelfth feedback type is corresponding to a twelfth feedback period, and the thirteenth feedback type is corresponding to a thirteenth feedback period; a feedback parameter of the eleventh feedback type includes RIs obtained by means of measurement according to the M CSI-RS resources, a feedback parameter of the twelfth feedback type includes the indication information and the PMIs 1 of the M CSI-RS resources, and a feedback parameter of the thirteenth feedback type includes the PMIs 2 and CQIs that are obtained by means of measurement according to the M CSI-RS resources, where a quantity of the PMIs 1 is 1, and if the PMIs 2 obtained by means of measurement according to the CSI-RS resources are the same, a quantity of the PMIs 2 is 1, or if the PMIs 2 obtained by means of measurement according to the CSI-RS resources are different, the PMIs 2 are M PMIs 2.

Optionally, in an embodiment of the present disclosure, the eleventh feedback period>the twelfth feedback period>the thirteenth feedback period.

Optionally, in an embodiment of the present disclosure, M≥2, and it is assumed that PMIs 1 obtained by means of measurement according to the CSI-RS resources are the same or different, and PMIs 2 obtained by means of measurement according to the CSI-RS resources are different.

The feedback mode is a second feedback mode; the feedback type includes a fourteenth feedback type, a fifteenth feedback type, a sixteenth feedback type, a seventeenth feedback type, and an eighteenth feedback type; the fourteenth feedback type is corresponding to a fourteenth feedback period, the fifteenth feedback type is corresponding to a fifteenth feedback period, the sixteenth feedback type is corresponding to a sixteenth feedback period, the seventeenth feedback type is corresponding to a seventeenth feedback period, and the eighteenth feedback type is corresponding to an eighteenth feedback period; a feedback parameter of the fourteenth feedback type includes RIs obtained by means of measurement according to the M CSI-RS resources, a feedback parameter of the fifteenth feedback type includes the indication information of the M CSI-RS resources and the PMIs 1 obtained by means of measurement according to the M CSI-RS resources, a feedback parameter of the sixteenth feedback type includes PMIs 2 obtained by means of measurement according to some of the M CSI-RS resources, a feedback parameter of the seventeenth feedback type includes PMIs 2 obtained by means of measurement according to remaining resources of the M CSI-RS resources, and a feedback parameter of the eighteenth feedback type includes CQIs obtained by means of measurement according to the M CSI-RS resources by using the PMIs 1 and the PMIs 2; where if the PMIs 1 obtained by means of measurement according to the CSI-RS resources are the same, a quantity of the PMIs 1 is 1, or if the PMIs 1 obtained by means of measurement according to the CSI-RS resources are different, the PMIs 1 are M PMIs 1.

Optionally, in an embodiment of the present disclosure, the fourteenth feedback period>the fifteenth feedback period>the sixteenth feedback period>the seventeenth feedback period>the eighteenth feedback period.

Optionally, in an embodiment of the present disclosure, M≥2, PMIs 1 of the CSI-RS resources are the same or different, and PMIs 2 of the CSI-RS resources are different.

The feedback mode is a second feedback mode; the feedback type includes a fourteenth feedback type, a fifteenth feedback type, a sixteenth feedback type, a seventeenth feedback type, and an eighteenth feedback type; the fourteenth feedback type is corresponding to a fourteenth feedback period, the fifteenth feedback type is corresponding to a fifteenth feedback period, the sixteenth feedback type is corresponding to a sixteenth feedback period, the seventeenth feedback type is corresponding to a seventeenth feedback period, and the eighteenth feedback type is corresponding to an eighteenth feedback period; a feedback parameter of the fourteenth feedback type includes RIs obtained by means of measurement according to the M CSI-RS resources, a feedback parameter of the fifteenth feedback type includes the indication information of the M CSI-RS resources and the PMIs 1 obtained by means of measurement according to the M CSI-RS resources, a feedback parameter of the sixteenth feedback type includes PMIs 2 obtained by means of measurement according to some of the M CSI-RS resources, a feedback parameter of the seventeenth feedback type includes PMIs 2 obtained by means of measurement according to remaining resources of the M CSI-RS resources, and a feedback parameter of the eighteenth feedback type includes CQIs obtained by means of measurement according to the M CSI-RS resources; where if the PMIs 1 of the CSI-RS resources are the same, a quantity of the PMIs 1 is 1, or if the PMIs 1 of the CSI-RS resources are different, the PMIs 1 are M different PMIs 1.

Optionally, in an embodiment of the present disclosure, the fourteenth feedback period>the fifteenth feedback period>the sixteenth feedback period>the seventeenth feedback period>the eighteenth feedback period.

Optionally, in an embodiment of the present disclosure, M is notified by the UE to the base station, or is determined by the base station.

Optionally, in an embodiment of the present disclosure, the receiving, by the base station, indication information of the M CSI-RS resources fed back by UE includes:

receiving, by the base station, the first indication information and the second indication information that are fed back by the UE in different feedback types.

Optionally, in an embodiment of the present disclosure, the receiving, by the base station, indication information of the M CSI-RS resources fed back by UE includes:

receiving, by the base station, the indication information of the M CSI-RS resources that is aperiodically fed back by the UE according to triggering by the base station.

Optionally, in an embodiment of the present disclosure, the CSI further includes a precoding type index PTI, a precoding matrix indicator PMI 2 corresponding to a subband codeword W2, and a subband channel quality indicator CQI; and when the PTI=0, the feedback parameter included in the feedback type is a precoding matrix indicator PMI 2 corresponding to a wideband codeword W2, and a wideband channel quality indicator CQI; or when the PTI=1, the feedback parameter included in the feedback type is the precoding matrix indicator PMI 2 corresponding to the subband codeword W2, and the subband channel quality indicator CQI.

When PMI=0, the indication information is updated; or when PMI=1, the indication information is not updated.

A sequence of feeding back the PTI and the indication information may be one of the following sequences:

the PTI and the indication information are fed back at the same time; the PTI is fed back first, and then the indication information is fed back; or the indication information is fed back first, and then the PTI is fed back.

The base station receives the indication information of the M CSI-RS resources that is aperiodically fed back by the UE.

Figure 16:
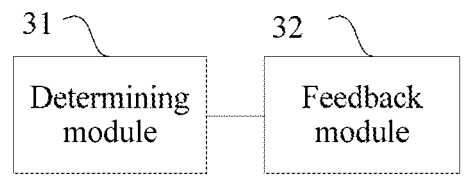
FIG. 16 is a schematic structural diagram of Embodiment 2 of user equipment according to the present disclosure.

FIG. 16 is a schematic structural diagram of Embodiment 2 of user equipment according to the present disclosure. The user equipment provided in this embodiment includes:

a determining module 31, configured to perform channel measurement according to reference signal resources including X antenna ports, to obtain channel state information CSI;

a feedback module 32, configured to feed back the channel state information CSI to a base station, where an antenna array corresponding to the X antenna ports includes at least two rows and two columns, and the CSI includes at least CSI of $M_a$ horizontal ports in the antenna array and CSI of $N_a$ vertical ports in the antenna array.

Optionally, in an embodiment of the present disclosure, a precoding matrix for the X antenna ports is W=W1×W2;

the first codeword W1 is $$W_1(k, l) = \begin{bmatrix} \tilde{X}_H^k \otimes \tilde{X}_V^l & 0 \\ 0 & \tilde{X}_H^k \otimes \tilde{X}_V^l \end{bmatrix},$$

where k=0, ..., $M_a Q_H-1$, l=0, ..., $N_a Q_V-1$, $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^b-1}]$, l=0, ... L, l'=f(l), where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^b-1}]$, k=0, ... K, k'=f(k), where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $$X^l = \begin{bmatrix} 1 & e^{j2\pi\frac{l}{NQ}} & \ldots & e^{j2\pi\frac{(N-1)l}{NQ}} \end{bmatrix}^T, l = 0, \ldots, NQ-1.$$

Optionally, in an embodiment of the present disclosure, the determining module 31 is further configured to determine a rank of the antenna array corresponding to $M_a \times N_a \times 2$ ports, a group number k of a fixed beam group $\tilde{X}_H^k$ in the horizontal dimension of the antenna array, and a group number l of a fixed beam group $\tilde{X}_V^l$ in the vertical dimension of the antenna array, so that the UE generates a precoding matrix according to k, l, and the second codeword W2, and determines a channel quality indicator CQI according to the precoding matrix, where the channel state information includes the rank, k, l, the CQI, and a precoding matrix indicator PMI 2 corresponding to the second codeword W2.

The feedback module 32 is specifically configured to feed back, according to a feedback type, the rank, k, l, and the CQI to the base station, where the feedback type refers to a feedback parameter fed back by the UE at a time at a feedback moment, and the feedback parameter includes at least one of the rank, k, l, the PMI 2, or the CQI.

Optionally, in an embodiment of the present disclosure, the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes k, a feedback parameter of the third feedback type includes l, a feedback parameter of the fourth feedback type includes the PMI 2 corresponding to the second codeword W2, and a feedback parameter of the fifth feedback type includes the CQI.

Optionally, in an embodiment of the present disclosure, the first feedback period>the second feedback period>the fourth feedback period>the fifth feedback period, or the first feedback period>the third feedback period>the fourth feedback period>the fifth feedback period.

Optionally, in an embodiment of the present disclosure, W=W1×W3;
the first codeword W1 is $$W_1(k,l) = \begin{bmatrix} \tilde{X}_H^k * W_2^H \otimes \tilde{X}_V^l * W_2^V & 0 \\ 0 & \tilde{X}_H^k * W_2^H \otimes \tilde{X}_V^l * W_2^V \end{bmatrix},$$

where $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} X_V^{l'+1} \ldots X_V^{l'+N_V^b-1}]$, l=0, ... L, l'=f(l), where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} X_H^{k'+1} \ldots X_H^{k'+N_H^b-1}]$, k=0, ... K, k'=f(k), where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $W_2^H$ is a second precoding matrix in the horizontal dimension, and is used to perform column selection for $\tilde{X}_H^k$, $W_2^V$ is a second precoding matrix in the vertical dimension, and is used to perform column selection for $\tilde{X}_V^l$, and W3 is used to adjust phases of the two groups of antennas of W1.

The feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes the first precoding matrix corresponding to the horizontal dimension of the antenna array, a feedback parameter of the third feedback type includes the first precoding matrix corresponding to the vertical dimension, a feedback parameter of the fourth feedback type includes the second precoding matrix corresponding to the horizontal dimension, a feedback parameter of the fifth feedback type includes the second precoding matrix corresponding to the vertical dimension, and a feedback parameter of a sixth feedback type includes a CQI; the first feedback period>the second feedback period>the third feedback period>the sixth feedback period, or the first feedback period>the third feedback period>the fourth feedback period>the sixth feedback period.

Figure 17:
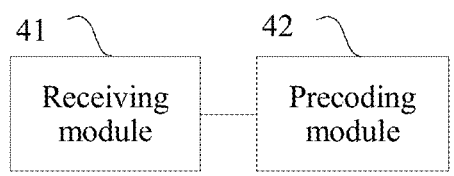
FIG. 17 is a schematic structural diagram of Embodiment 2 of a base station according to the present disclosure.

FIG. 17 is a schematic structural diagram of Embodiment 2 of a base station according to the present disclosure. As shown in FIG. 17, the base station provided in this embodiment includes:

a receiving module 41, configured to receive channel state information CSI fed back by user equipment UE, where the CSI is obtained by the user equipment by means of channel measurement according to reference signal resources including X antenna ports, an antenna array corresponding to the X antenna ports includes at least two rows and two columns, and the CSI includes at least CSI of $M_a$ horizontal ports in the antenna array and CSI of $N_a$ vertical ports in the antenna array; and a precoding module 42, configured to perform precoding according to the channel state information.

Optionally, in an embodiment of the present disclosure, a precoding matrix for the X antenna ports is W=W1×W2;
the first codeword W1 is $$W_1(k,l) = \begin{bmatrix} \tilde{X}_H^k \otimes \tilde{X}_V^l & 0 \\ 0 & \tilde{X}_H^k \otimes \tilde{X}_V^l \end{bmatrix},$$

where k=0, ..., $M_aQ_H-1$, l=0, ..., $N_aQ_V-1$, $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} \ X_V^{l'+1} \ \ldots \ X_V^{l'+N_V^b-1}]$, $l=0, \ldots L$, $l'=f(l)$, where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} \ X_H^{k'+1} \ \ldots \ X_H^{k'+N_H^b-1}]$, $k=0, \ldots K$, $k'=f(k)$, where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $$X^l = \begin{bmatrix} 1 & e^{j2\pi \frac{l}{NQ}} & \ldots & e^{j2\pi \frac{(N-1)l}{NQ}} \end{bmatrix}^T, l = 0, \ldots, NQ-1.$$

Optionally, in an embodiment of the present disclosure, the channel state information includes a rank of the antenna array corresponding to $M_a \times N_a \times 2$ ports that is determined by the UE, a group number k of a fixed beam group $\tilde{X}_H^k$ in the horizontal dimension of the antenna array that is determined by the UE, a group number l of a fixed beam group $\tilde{X}_V^l$ in the vertical dimension of the antenna array that is determined by the UE, and a channel quality indicator CQI determined by the UE.

The receiving module 41 is specifically configured to receive the rank, k, l, the CQI, and a precoding matrix indicator PMI 2 corresponding to the second codeword W2 that are fed back by the UE according to the double codebook structure and a feedback type, where the feedback type refers to a feedback parameter fed back by the UE at a time at a feedback moment, and the feedback parameter includes at least one of the rank, k, l, the PMI 2, or the CQI.

Optionally, in an embodiment of the present disclosure, the feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes k, a feedback parameter of the third feedback type includes l, a feedback parameter of the fourth feedback type includes the PMI 2 corresponding to the second codeword W2, and a feedback parameter of the fifth feedback type includes the CQI.

Optionally, in an embodiment of the present disclosure, the first feedback period>the second feedback period>the fourth feedback period>the fifth feedback period, or the first feedback period>the third feedback period>the fourth feedback period>the fifth feedback period.

Optionally, in an embodiment of the present disclosure, W=W1×W3;
the first codeword W1 is $$W_1(k, l) = \begin{bmatrix} \tilde{X}_H^k * W_2^H \otimes \tilde{X}_V^l * W_2^V & 0 \\ 0 & \tilde{X}_H^k * W_2^H \otimes \tilde{X}_V^l * W_2^V \end{bmatrix},$$

where $M_a$ is a quantity of co-polarized antennas in a horizontal dimension of the antenna array, $N_a$ is a quantity of co-polarized antennas in a vertical dimension of the antenna array, $Q_H$ is an over-sampling factor in the horizontal dimension of the antenna array, and $Q_V$ is an over-sampling factor in the vertical dimension of the antenna array;

$\tilde{X}_V^l = [X_V^{l'} \ X_V^{l'+1} \ \ldots \ X_V^{l'+N_V^b-1}]$, $l=0, \ldots L$, $l'=f(l)$, where $\tilde{X}_V^l$ is a first precoding matrix corresponding to the vertical dimension of the antenna array, l is an index PMI_V 1 of the first precoding matrix corresponding to the vertical dimension, and L is a total quantity of first precoding matrices corresponding to the vertical dimension;

$\tilde{X}_H^k = [X_H^{k'} \ X_H^{k'+1} \ \ldots \ X_H^{k'+N_H^b-1}]$, $k=0, \ldots K$, $k'=f(k)$, where $\tilde{X}_H^k$ is a first precoding matrix corresponding to the horizontal dimension of the antenna array, k is an index PMI_H 1 of the first precoding matrix corresponding to the horizontal dimension, and K is a total quantity of first precoding matrices corresponding to the horizontal dimension; and $W_2^H$ is a second precoding matrix in the horizontal dimension, and is used to perform column selection for $\tilde{X}_H^k$, $W_2^V$ is a second precoding matrix in the vertical dimension, and is used to perform column selection for $\tilde{X}_V^l$, and W3 is used to adjust phases of the two groups of antennas of W1.

The feedback type includes a first feedback type, a second feedback type, a third feedback type, a fourth feedback type, and a fifth feedback type; the first feedback type is corresponding to a first feedback period, the second feedback type is corresponding to a second feedback period, the third feedback type is corresponding to a third feedback period, the fourth feedback type is corresponding to a fourth feedback period, and the fifth feedback type is corresponding to a fifth feedback period; a feedback parameter of the first feedback type includes the rank, a feedback parameter of the second feedback type includes the first precoding matrix corresponding to the horizontal dimension of the antenna array, a feedback parameter of the third feedback type includes the first precoding matrix corresponding to the vertical dimension, a feedback parameter of the fourth feedback type includes the second precoding matrix corresponding to the horizontal dimension, a feedback parameter of the fifth feedback type includes the second precoding matrix corresponding to the vertical dimension, and a feedback parameter of a sixth feedback type includes a CQI; the first feedback period>the second feedback period>the third feedback period>the sixth feedback period, or the first feedback period>the third feedback period>the fourth feedback period>the sixth feedback period.

Figure 18:
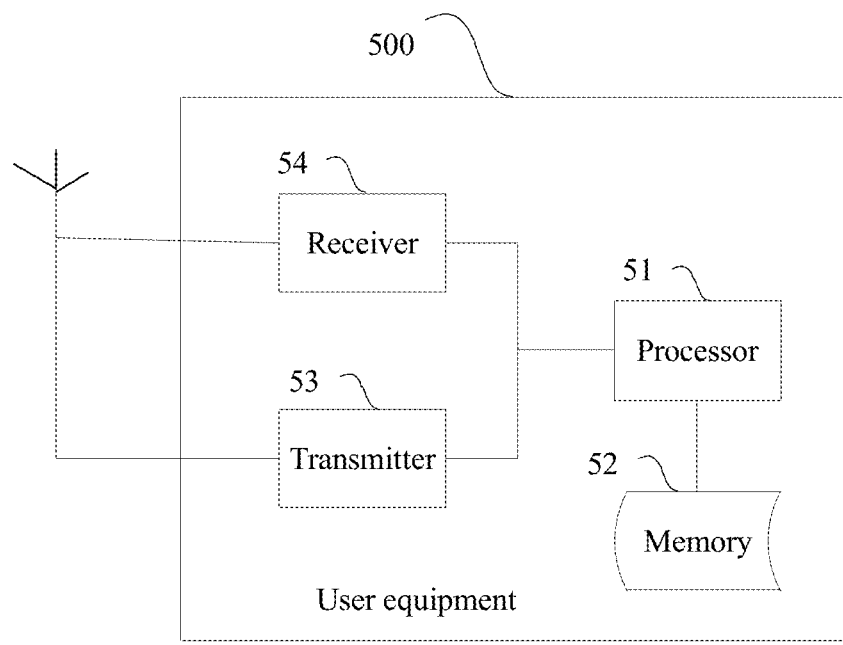
FIG. 18 is a schematic structural diagram of Embodiment 3 of user equipment according to the present disclosure.

FIG. 18 is a schematic structural diagram of Embodiment 3 of user equipment according to the present disclosure. As shown in FIG. 18, user equipment 500 provided in this embodiment includes a processor 51 and a memory 52. The user equipment 500 may further include a transmitter 53 and a receiver 54. The transmitter 53 and the receiver 54 may be connected to the processor 51. The memory 52 stores an execution instruction. When the user equipment 500 runs, the processor 51 communicates with the memory 52. The processor 51 invokes the execution instruction in the memory 52 to execute the method embodiment shown in FIG. 3; implementation principles and technical effects thereof are similar, and details are not described herein.

Figure 19:
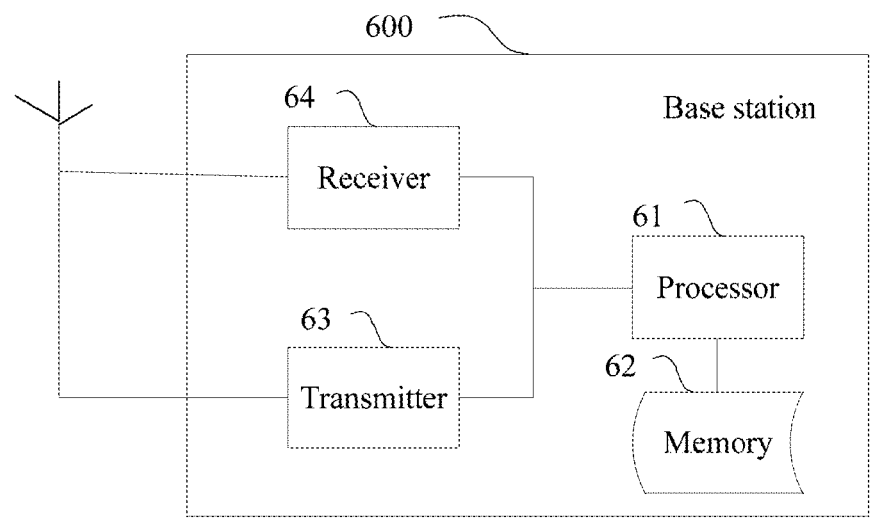
FIG. 19 is a schematic structural diagram of Embodiment 3 of a base station according to the present disclosure.

FIG. 19 is a schematic structural diagram of Embodiment 3 of a base station according to the present disclosure. As shown in FIG. 19, a base station 600 provided in this embodiment includes a processor 61 and a memory 62. The base station 600 may further include a transmitter 63 and a receiver 64. The transmitter 63 and the receiver 64 may be connected to the processor 61. The memory 62 stores an execution instruction. When the base station 600 runs, the processor 61 communicates with the memory 62. The processor 61 invokes the execution instruction in the memory 62 to execute the method embodiment shown in FIG. 4; implementation principles and technical effects thereof are similar, and details are not described herein.

Figure 20:
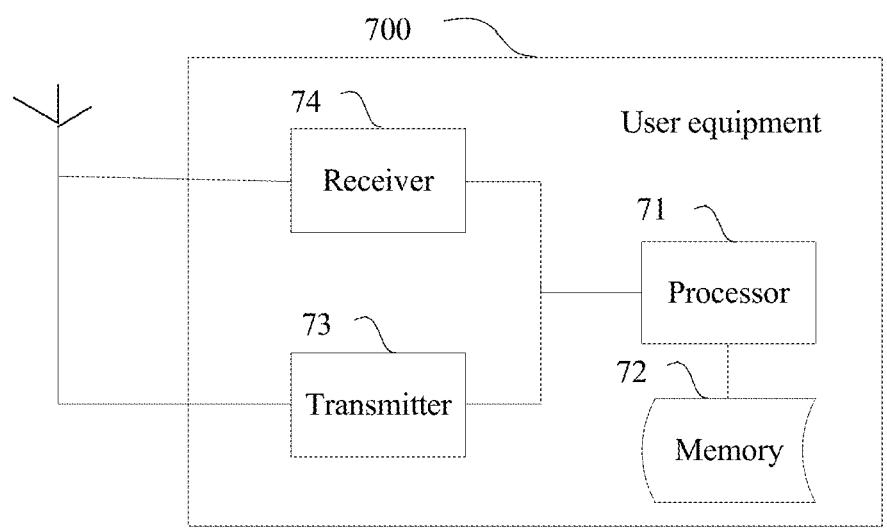
FIG. 20 is a schematic structural diagram of Embodiment 4 of user equipment according to the present disclosure.

FIG. 20 is a schematic structural diagram of Embodiment 4 of user equipment according to the present disclosure. As shown in FIG. 20, user equipment 700 provided in this embodiment includes a processor 71 and a memory 72. The user equipment 700 may further include a transmitter 73 and a receiver 74. The transmitter 73 and the receiver 74 may be connected to the processor 71. The memory 72 stores an execution instruction. When the user equipment 700 runs, the processor 71 communicates with the memory 72. The processor 71 invokes the execution instruction in the memory 72 to execute the method embodiment shown in FIG. 12; implementation principles and technical effects thereof are similar, and details are not described herein.

Figure 21:
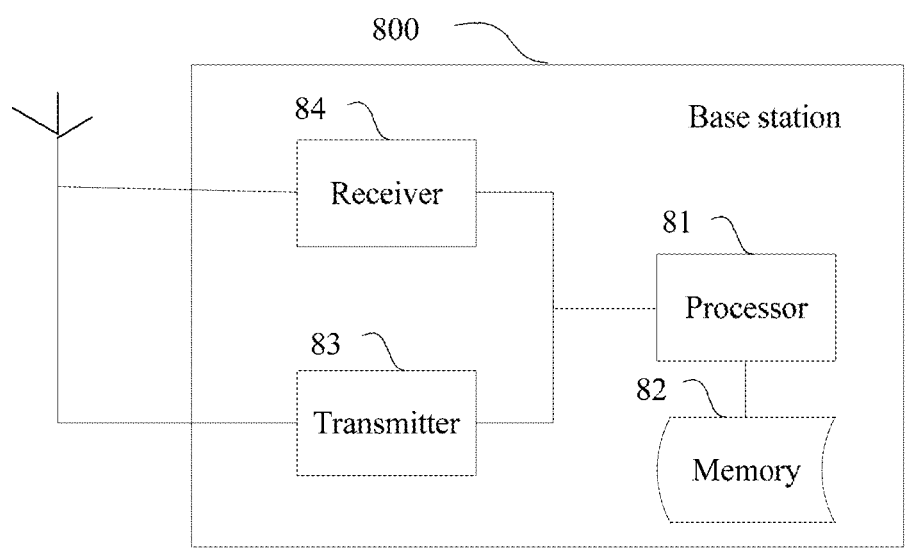
FIG. 21 is a schematic structural diagram of Embodiment 4 of a base station according to the present disclosure.

FIG. 21 is a schematic structural diagram of Embodiment 4 of a base station according to the present disclosure. As shown in FIG. 21, a base station 800 provided in this embodiment includes a processor 81 and a memory 82. The base station 800 may further include a transmitter 83 and a receiver 84. The transmitter 83 and the receiver 84 may be connected to the processor 81. The memory 82 stores an execution instruction. When the base station 800 runs, the processor 81 communicates with the memory 82. The processor 81 invokes the execution instruction in the memory 82 to execute the method embodiment shown in FIG. 13; implementation principles and technical effects thereof are similar, and details are not described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. User equipment, comprising:
a receiver configured to receive N configured channel state information-reference signal (CSI-RS) resources, wherein the CSI-RS resources comprise at least one port, N>2, and N is an integer;
a processor configured to:
perform channel measurement on the N CSI-RS resources, to obtain channel state information (CSI) of the N CSI-RS resources,
select M CSI-RS resources from the N CSI-RS resources, wherein the M CSI-RS resources belong to different CSI processes, or the M CSI-RS resources belong to different configurations of one CSI process, wherein the CSI of each of the M CSI-RS resources comprises a rank indication (RI), a first precoding matrix indicator (PMI) corresponding to a first codeword (W1), a second PMI corresponding to a second codeword (W2), and a channel quality indicator (CQI), wherein the W1 and the W2 of the CSI correspond, respectively, to a W1 and a W2 in a double codebook structure W, and W=W1*W2, and
determine CSI of the M CSI-RS resources from the CSI of the N CSI-RS resources according to the M CSI-RS resources; and
a transmitter configured to feed back the CSI of the M CSI-RS resources and indication information of the M CSI-RS resources to a base station according to a feedback mode and a feedback type, wherein the feedback type comprises a feedback parameter fed back by the user equipment at a feedback moment, and the feedback parameter comprises at least one of the RI, the first PMI, the second PMI, the CQI, or the indication information.

2. The user equipment according to claim 1, wherein the RIs of the M CSI-RS resources are obtained by means of measurement according to the M CSI-RS resources.

3. The user equipment according to claim 1, wherein M is notified by the base station to the UE, or M is determined by the UE.

4. The user equipment according to claim 1, wherein the indication information of the M CSI-RS resources comprises first indication information and/or second indication information, and wherein the first indication information is a value of M and the second indication information comprises indexes of the M CSI-RS resources.

5. The user equipment according to claim 4, wherein the processor is further configured to feed back the first indication information and the second indication information in different feedback types.

6. The user equipment according to claim 1, wherein the processor is further configured to aperiodically feed back the indication information of the M CSI-RS resources to the base station.

7. A base station, comprising:
a receiver configured to receive channel state information (CSI) of M CSI-RS resources and indication information of the M CSI-RS resources that are fed back by user equipment (UE), wherein the M CSI-RS resources are selected by the UE from N CSI-RS resources, the N CSI-RS resources are configured by the base station and received by the UE, the CSI-RS resources comprise at least one port, N >2, and N is an integer, wherein the CSI of each of the M CSI-RS resources comprises a rank indication (RI), a first precoding matrix indicator (PMI) corresponding to a first codeword (W1), a second PMI corresponding to a second codeword (W2), and a channel quality indicator (CQI), wherein the W1 and the W2 of the CSI correspond, respectively, to a W1 and a W2 in a double codebook structure W, and W=W1*W2; and
a processor configured to perform precoding according to the M CSI-RS resources, wherein the receiver is configured to receive the CSI of the M CSI-RS resources arid the indication information of the M CSI-RS resources that are fed back by the UE according to a feedback mode and a feedback type, wherein the feedback type comprises a feedback parameter fed back by the UE at a feedback moment, and the feedback parameter comprises at least one of the RI, the PMI 1, the PMI 2, the CQI, or the indication information.

8. The base station according to claim 7, wherein the RIs of the M CSI-RS resources are obtained by means of measurement according to the M CSI-RS resources.

9. The base station according to claim 7, wherein the indication information of the M CSI-RS resources comprises first indication information and/or second indication information, and wherein the first indication information is a value of M and the second indication information comprises indexes of the M CSI-RS resources.

10. The base station according to claim 9, wherein the receiver is further configured to receive the first indication information and the second indication information that are fed back by the UE in different feedback types.

11. The base station according to claim 7, wherein the receiver is further configured to receive the indication information of the M CSI-RS resources that is aperiodically fed back by the UE according to triggering by the base station.

12. A channel state information feedback method, comprising:
  receiving, by user equipment (UE), N configured channel state information-reference signal (CSI-RS) resources, wherein the CSI-RS resources comprise at least one port, N >2, and N is an integer;
  performing, by the UE, channel measurement on the N CSI-RS resources, to obtain channel state information (CSI) of the N CSI-RS resources;
  selecting, by the UE, M CSI-RS resources from the N CSI-RS resources, wherein the M CSI-RS resources belong to different CSI processes, or the M CSI-RS resources belong to different configurations of one CSI process, wherein the CSI of each of the M CSI-RS resources comprises a rank indication (RI), a first precoding matrix indicator (PMI) corresponding to a first codeword (W1), a second PMI corresponding to a second codeword (W2), and a channel quality indicator (CQI), wherein the W1 and the W2 of the CSI correspond, respectively, to a W1 and a W2 in a double codebook structure W, and W=W1*W2;
  determining, by the UE, CSI of the M CSI-RS resources from the channel state information CSI of the N CSI-RS resources according to the M CSI-RS resources; and
  feeding back, by the UE, the CSI of the M CSI-RS resources and indication information of the M CSI-RS resources to a base station according to a feedback mode and a feedback type, wherein the feedback type comprises a feedback parameter fed back by the user equipment at a feedback moment, and the feedback parameter comprises at least one of the RI, the first PMI, the second PMI, the CQI, or the indication information.

13. The method according to claim 12, wherein the RIs of the M CSI-RS resources are obtained by means of measurement according to the M CSI-RS resources.

14. The method according to claim 12, wherein M is notified by the base station to the UE, or M is determined by the UE.

15. The method according to claim 12, wherein the indication information of the M CSI-RS resources comprises first indication information and/or second indication information, and wherein the first indication information is a value of M and the second indication information comprises indexes of the M CSI-RS resources.

16. The method according to claim 15, further comprising:
  feeding back the first indication information and the second indication information in different feedback types.

17. The method according to claim 12, wherein the indication information of the M CSI-RS resources is aperiodically fed back to the base station.

* * * * *